United States Patent
Suzuki

(10) Patent No.: US 9,767,052 B2
(45) Date of Patent: Sep. 19, 2017

(54) INFORMATION PROCESSING APPARATUS, INFORMATION PROCESSING METHOD, AND STORAGE MEDIUM

(71) Applicant: FUJITSU LIMITED, Kawasaki-shi, Kanagawa (JP)

(72) Inventor: Yasuo Suzuki, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 14/608,287

(22) Filed: Jan. 29, 2015

(65) Prior Publication Data

US 2015/0242342 A1 Aug. 27, 2015

(30) Foreign Application Priority Data

Feb. 24, 2014 (JP) .................. 2014-033431

(51) Int. Cl.
*G06F 12/02* (2006.01)
*G06F 13/16* (2006.01)
*G06F 9/50* (2006.01)

(52) U.S. Cl.
CPC ........ *G06F 13/1663* (2013.01); *G06F 9/5077* (2013.01); *G06F 13/1694* (2013.01); *G06F 12/0284* (2013.01); *G06F 2212/2542* (2013.01)

(58) Field of Classification Search
CPC ............. G06F 12/0284; G06F 13/1663; G06F 13/1694; G06F 2212/2542; G06F 9/5077
See application file for complete search history.

(56) References Cited

U.S. PATENT DOCUMENTS

2013/0339956 A1* 12/2013 Murase .................. G06F 9/505
718/1

FOREIGN PATENT DOCUMENTS

JP 2011-238278 11/2011
JP 2012-146105 8/2012

OTHER PUBLICATIONS

"An Advanced Configuration and Power Interface Specification", Revision 5.0, p. 151-155, issued on Dec. 6, 2011, [online] Internet Search Dec. 13, 2013, <URL:http://www.acpi.info/DOWNLOADS/ACPIspec50.pdf>.

* cited by examiner

*Primary Examiner* — Yong Choe
(74) *Attorney, Agent, or Firm* — Staas & Halsey LLP

(57) ABSTRACT

An information processing apparatus includes a first memory, and a processor coupled to the first memory and configured to: specify a number of virtual machines executed on each node of a plurality of nodes on an information processing system that performs as a plurality of virtual machines, and calculate a value indicating a degree of deviation of the number of the virtual machines between the plurality of nodes.

16 Claims, 26 Drawing Sheets

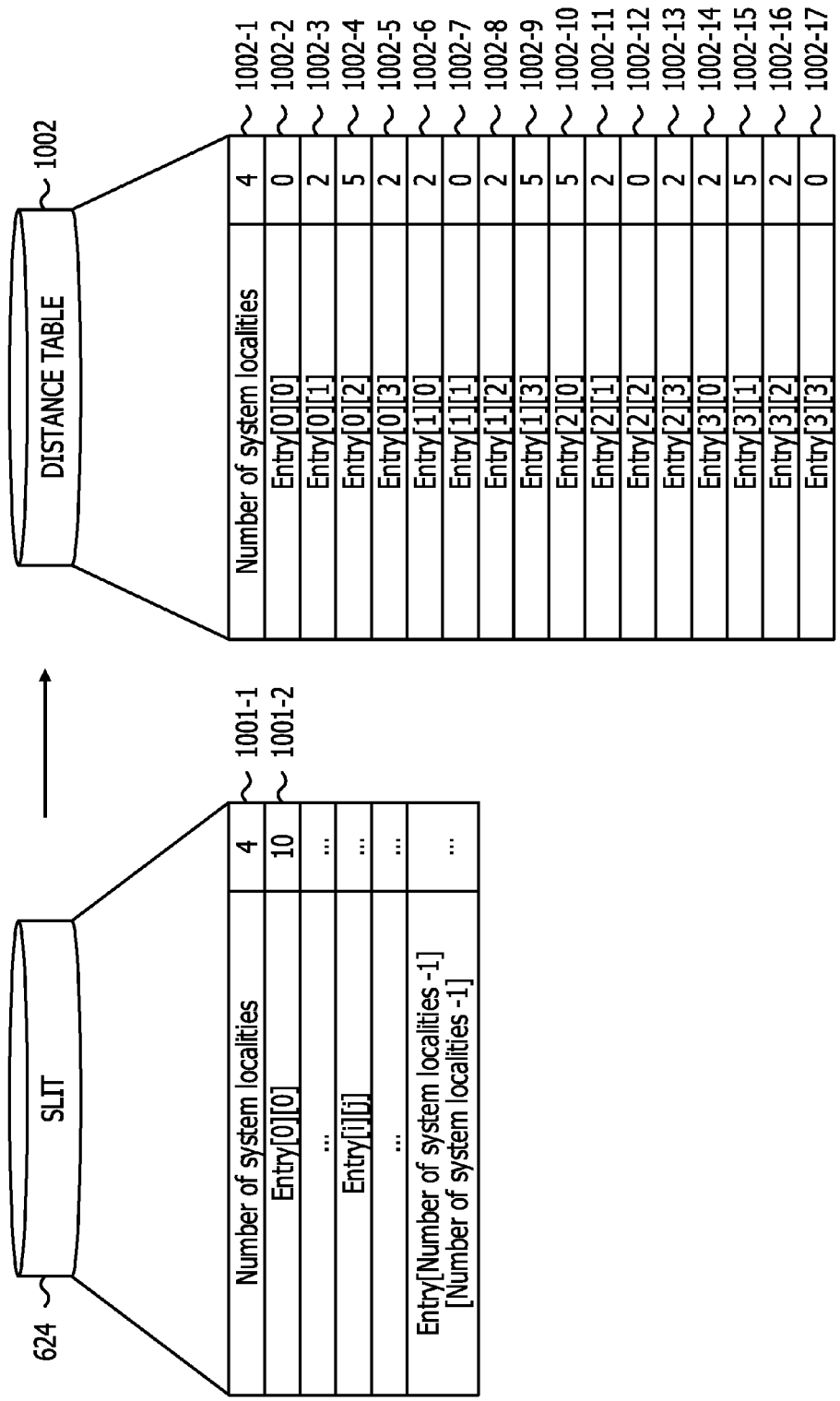

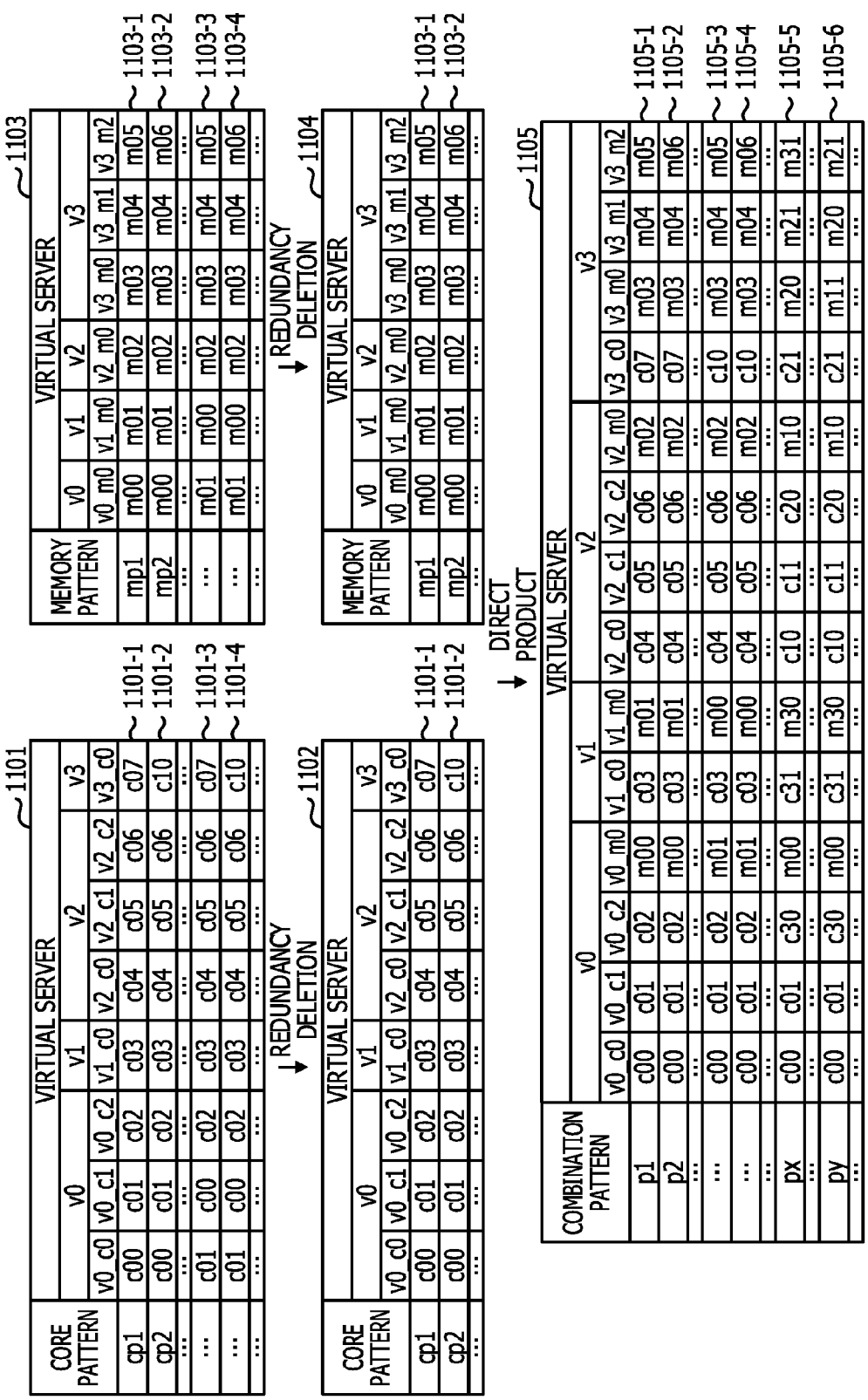

INFORMATION PROCESSING APPARATUS, INFORMATION PROCESSING METHOD, AND STORAGE MEDIUM

CROSS-REFERENCE TO RELATED APPLICATION

This application is based upon and claims the benefit of priority of the prior Japanese Patent Application No. 2014-033431, filed on Feb. 24, 2014, the entire contents of which are incorporated herein by reference.

FIELD

The embodiments discussed herein are related to an information processing apparatus, an information processing method, and a storage medium.

BACKGROUND

In the related art, there is a system-constructing technique, which is called non-uniform memory access (NUMA), for constructing a system with a plurality of nodes in which the respective nodes include cores and memories and the memories are shared between the nodes. Further, there is a technique of executing a virtual machine (VM) on a system to which NUMA is applied.

In the related art, for example, there is a technique of stopping a VM which is a remote memory for a central processing unit (CPU) allocated in a VM, moving information stored in the remote memory allocated in the stopped VM to a local memory, and avoiding expansion of an error. Further, there is a technique in which a virtual machine monitor (VMM) that manages physical resources preferentially selects a combination in which the distance between CPUs after VM allocation is short with respect to the number of designated CPUs. As the related art, disclosed are Japanese Laid-open Patent Publication Nos. 2011-238278 and 2012-146105.

SUMMARY

According to an aspect of the invention, an information processing apparatus includes a first memory, and a processor coupled to the first memory and configured to: specify a number of virtual machines executed on each node of a plurality of nodes on an information processing system that performs as a plurality of virtual machines, and calculate a value indicating a degree of deviation of the number of the virtual machines between the plurality of nodes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an explanatory diagram illustrating a portion of a SLIT;

FIG. 11 is an explanatory diagram illustrating a creation example of a plurality of combination patterns;

DESCRIPTION OF EMBODIMENTS

According to the related art, when a plurality of virtual machines are executed on a system to which NUMA is applied, if a portion of nodes in the system have errors, it is difficult to evaluate how much influence is given to the plurality of virtual machines in the system.

According to an aspect of the present disclosure, provided is an information processing apparatus that may evaluate how much influence the errors of the portion of nodes in the system give to the plurality of virtual machines executed in the system, and an information processing method thereof.

Figure 1:
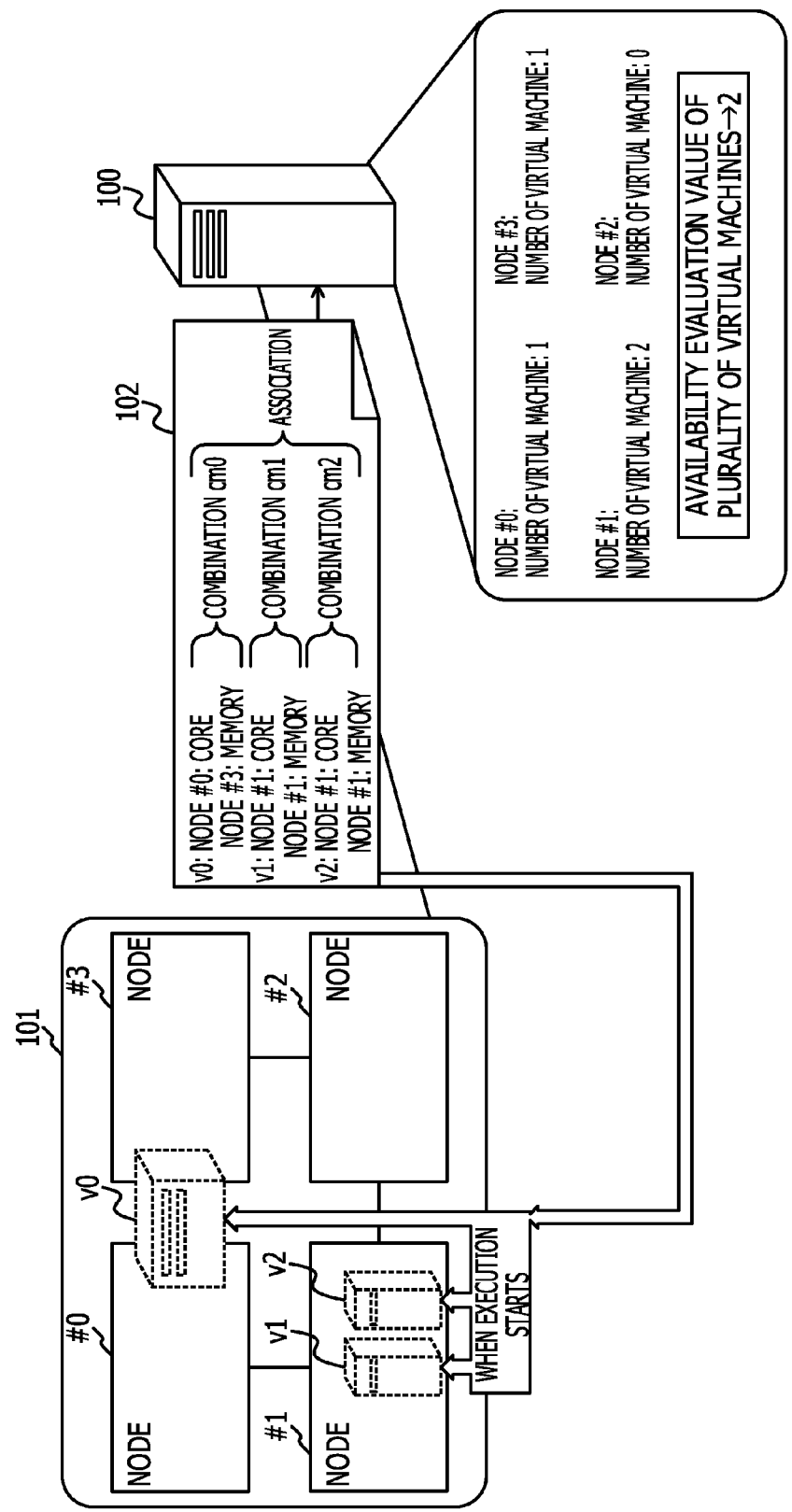
FIG. 1 is an explanatory diagram illustrating an operation example of an information processing apparatus according to an embodiment.

FIG. 1 is an explanatory diagram illustrating an operation example of an information processing apparatus according to the embodiment. An information processing apparatus 100 is a computer that calculates a value indicating a degree of the influence that the errors of the nodes in a system 101 give to the plurality of virtual machines executed on the system 101, and supports the evaluation of the degree of the influence. The system 101 is a system including a plurality of nodes. In the example of FIG. 1, as the plurality of nodes, nodes #0 to #3 include cores and memories. Further, the nodes #0 to #3 share at least a portion of the memories included in each node between nodes.

In the example of FIG. 1, the system 101 is a system that executes virtual machines v0 to v2, as the plurality of virtual machines. In FIG. 1, the virtual machines v0 to v2 are expressed as computers illustrated with dotted lines. Here, the virtual machine is a computer system virtually created by using hardware resources of the system 101. Any virtually created computer systems may be used as the virtual machines v0 to v2. For example, the virtual machines v0 to v2 may be servers that provide services or data to other computers, or may be computers that receive the services or the data provided by the servers. As a circumstance in which the system 101 is used, for example, there is a circumstance in which a plurality of physical servers that operate business applications are integrated with the system 101 that executes a plurality of virtual machines. The operation cost of the servers may be decreased and the electric power consumption may be decreased by operating the business applications by the plurality of virtual machines that are executed by the system 101 instead of the physical servers.

When the physical servers are integrated, the plurality of applications are executed at the same time, and therefore multiple cores and memories are desired in the system 101. Here, a method of constructing a system including a plurality of cores and a plurality of memories includes symmetric multiprocessing (SMP) and NUMA.

SMP is a method of constructing a system for coupling all cores and all memories to one bus or one switch. Accordingly, if the number of cores increases in a system to which SMP is applied, since accesses from the cores to the memories are concentrated on the one bus or the one switch, it is difficult to increase the number of cores in the system to which SMP is applied.

Meanwhile, NUMA is a method of constructing a system including a plurality of nodes in which nodes including cores and memories are coupled each other. In the system to which NUMA is applied, it is easy to increase cores and memories by decreasing the numbers of cores and memories which access a bus or a switch. For the reasons above, NUMA is mainly applied to the system 101. Here, in NUMA, all memories are arranged in a single memory space and all cores are desired to be accessible to all memories. However, if at least a portion of all the memories is shared between nodes, virtual machines throughout the plurality of nodes may be executed, and therefore the system 101 may share at least a portion of all the memories between nodes.

In NUMA, the speed of the access from a core included in a certain node to a memory included in the certain node is high, but the speed of the access from a core included in a certain node to a memory included in another node is low as the number of the buses or switches increases. Here, in NUMA, a memory in the same node as the node in which the core is included is referred to as a "local memory" viewed from the core, and also the memory of another node is referred to as a "remote memory". It is preferable that the system 101 to which NUMA is applied accesses the local memory, if possible.

Accordingly, when the system 101 executes the virtual machine, it is possible to execute the virtual machine in the same node whenever possible. The virtual machine executed on the same node has higher access performance than the virtual machine executed through another node. Then, if the access performance increases, the process of the virtual machine itself also increases. Therefore, the process performance of the virtual machine executed on the same node is higher than that of virtual machine executed through another node.

In the system to which NUMA is applied, as a method of increasing the process performance of the virtual machine, for example, there is a method of preferentially selecting a combination in which a distance between cores when executing the virtual machine is short, and preferentially selecting memories that are at a short distance from the selected core.

Further, in the system to which NUMA is applied, it is possible to avoid expansion of errors by executing the virtual machine in the same node. Specifically, the virtual machine executed through two nodes stops the execution when an error is generated in either of two nodes, but the virtual machine executed on the same node stops the execution when an error is generated in one node. In this manner, the degree of the influence by the error changes according to a method of allocating virtual machines. The degree of the influence by the error is referred to as "availability" in the present embodiment. According to the aforementioned example, the availability of the virtual machine executed on the same node is higher than the availability of the virtual machine executed through two nodes.

However, the aforementioned availability of the virtual machine is the availability of one virtual machine, and it is difficult to evaluate the availability of a plurality of virtual machines based on how much influence is given to the plurality of virtual machines when errors are generated in a portion of nodes in the system 101. Further, from the hardware resources of the system 101, the number of combinations for determining the hardware resources used by the plurality of virtual machines becomes a massive number as the number of cores or the number of memories included in the node is increased. It is difficult for the user of the system 101 to find a combination with an optimum availability of the plurality of virtual machines among the massive number of combinations by using his or her own know-how.

Therefore, the information processing apparatus 100 according to the present embodiment calculates a value indicating a degree of deviation between nodes based on the number of virtual machines per node, from the number of the virtual machines in each node executed by using cores or memories included in the respective nodes in the system 101. Hereinafter, a value indicating the degree of deviation is referred to as an "availability evaluation value". The availability evaluation value may be a value indicating a variation degree between nodes with respect to the number of virtual machines in each node. The availability evaluation value described below is a value indicating the degree of deviation, and a value indicating that the degree of deviation is high as the numerical value is high. The information processing apparatus 100 may evaluate the degree of the influence that the errors of a portion of nodes in the system 101 give to the plurality of virtual machines executed on the system 101 by using the availability evaluation value.

Here, with respect to the relationship between the information processing apparatus 100 and the system 101, the information processing apparatus 100 and the system 101 may be directly coupled to each other. Further, the information processing apparatus 100 and the system 101 may not be directly coupled, and the information processing apparatus 100 may have information for specifying the cores and the memories used in the execution of the plurality of virtual machines executed by the system 101. Further, the process of calculating the availability evaluation value performed by the information processing apparatus 100 may be executed by any of the nodes of the system 101. FIG. 1 illustrates a case in which the information processing apparatus 100 and the system 101 are directly coupled to each other.

Here, the timing of calculating the availability evaluation value by the information processing apparatus 100 is the timing before the system 101 starts the execution of the plurality of virtual machines, and before the virtual machine is allocated. Further, as another example of the timing when the information processing apparatus 100 calculates the availability evaluation value, the system 101 may have already started executing the plurality of virtual machines, and calculates the availability evaluation values of the plurality of virtual machines under execution. In the example of FIG. 1, the timing when the information processing apparatus 100 calculates the availability evaluation values is before the system 101 starts the execution of the plurality of virtual machines.

The information processing apparatus 100 acquires association information associated with the combination of the cores and the memories that are used when executing the respective virtual machines included in the plurality of virtual machines executed on the system 101. Hereinafter, the association information is referred to as a "combination pattern". In the example of FIG. 1, the information processing apparatus 100 acquires a combination pattern 102 associated with the combinations of the cores and the memories used when executing the virtual machines v0 to v2. The combination pattern 102 is a set of combinations.

Here, as a method of acquiring the combination pattern 102, the information processing apparatus 100 and the system 101 are directly coupled to each other, and the system 101 stores the combination pattern 102. The information processing apparatus 100 may acquire the combination pattern 102 stored in the system 101. Further, when the cores and the memories to be used in the execution of the virtual machines v0 to v2 by the user of the information processing apparatus 100 are designated, the information processing apparatus 100 may acquire the combination pattern 102 by using the designated information. Further, when the number of cores and the number of memories which are used in the execution of the virtual machines v0 to v2 are designated by the user of the information processing apparatus 100, the information processing apparatus 100 may acquire the combination pattern 102 by creating the combination pattern 102 from the designated information. In the example of FIG. 1, the system 101 stores the combination pattern 102.

The combination pattern 102 according to the example of FIG. 1 is a set in which combinations cm0 to cm2 to be described below are associated with each other. The combination cm0 is information in which the core included in the node #0 as the core used in the execution of the virtual machine v0 and the memory included in the node #3 as the memory used in the execution of the virtual machine v0 are combined. The combination cm1 is information in which the core included in the node #1 as the core used in the execution of the virtual machine v1 and the memory included in the node #1 as the memory used in the execution of the virtual machine v1 are combined. The combination cm2 is information in which the core included in the node #1 as the core used in the execution of the virtual machine v2 and the memory included in the node #1 as the memory used in the execution of the virtual machine v2 are combined.

Next, the information processing apparatus 100 calculates the availability evaluation values between nodes with respect to the number of virtual machines of each node executed by using the cores and the memories included in the respective nodes of the system 101 based on the combination pattern 102. If the availability evaluation values are small, the plurality of virtual machines are distributed in the respective nodes. Therefore, even if an error is generated in a certain node as a portion of nodes, the number of virtual machines that stop execution among the plurality of virtual machines is small, so the availability is high. Meanwhile, when the availability evaluation values are great, the plurality of virtual machines are arranged to be deviated to a certain node. Therefore, if an error is generated in a certain node, the number of virtual machines that stop execution is great, so the availability decreases. As the availability evaluation values, the information processing apparatus 100 may set the maximum value among the numbers of the virtual machines in respective nodes to be the availability evaluation value, or may set the distribution value of the numbers of the virtual machines in respective nodes or the standard deviation to be the availability evaluation value.

Subsequently, a method of specifying the number of virtual machines in respective nodes to be executed by using the cores or the memories included in the respective nodes is described. Specifically, the information processing apparatus 100 counts based on the combination pattern 102 the number of virtual machines, per node, executed by using the cores or the memories included in the respective nodes. As an example of a specific counting method, the information processing apparatus 100 counts the number of virtual machines, per node, using the cores or the memories included in the nodes by using the virtual machine specified from the respective combinations of the combination pattern 102. Further, as another example of the counting method, the information processing apparatus 100 prepares array variables per node. Then, the information processing apparatus 100 specifies the nodes including the cores or the memories used by the virtual machines specified from the respective combinations of the combination pattern 102, and increments the value of the variables corresponding to the specified nodes.

In the example of FIG. 1, the information processing apparatus 100 counts the number of virtual machines of the nodes #0 and #3 to be 1, the number of virtual machines of the node #1 to be 2, and the number of virtual machines of the node #2 to be 0. Further, when the information processing apparatus 100 counts the number of virtual machines for the respective nodes and the count result exceeds a certain threshold value, it is regarded that the plurality of virtual machines are arranged to be deviated to a certain node, the counting thereafter is stopped, and the availability evaluation value may be a value of exceeding the threshold value.

Subsequently, with respect to an example of FIG. 1, the information processing apparatus 100 calculates the availability evaluation values of the plurality of virtual machines based on the number of virtual machines for each node executed by using the cores and the memories included in the respective nodes. In the example of FIG. 1, the maximum value is used as the availability evaluation value. Since the maximum value of the number of the virtual machines of the nodes #0 to #3 is 2, the information processing apparatus 100 calculates the availability evaluation value to be 2. After the availability evaluation value is calculated, the system 101 allocates the plurality of virtual machines according to the combination pattern 102 to start executing the plurality of virtual machines.

As a first method of using the availability evaluation value, for example, the information processing apparatus 100 may determine that the availability evaluation value exceeds 1, and output the assumption that virtual machines are deviated to any of the plurality of nodes #0 to #3 to be executed. Further, as a second method of using the availability evaluation value, it is assumed that the user of the information processing apparatus 100 recognizes that the number of cores and the number of memories used in the execution of the virtual machines both are less than the number of cores and the number of memories included in one node. Here, if there are four nodes and three virtual machines and the virtual machines are not deviated to any of nodes to be executed, the availability evaluation value is 1. The user of the information processing apparatus 100 may recognize that when one node has an error, there is an influence on the maximum two virtual servers since the virtual machines are deviated to any of nodes to be executed by reading that the availability evaluation value is 2. Next, the example in which the system 101 is applied to the NUMA system is described with reference to FIG. 2.

Figure 2:
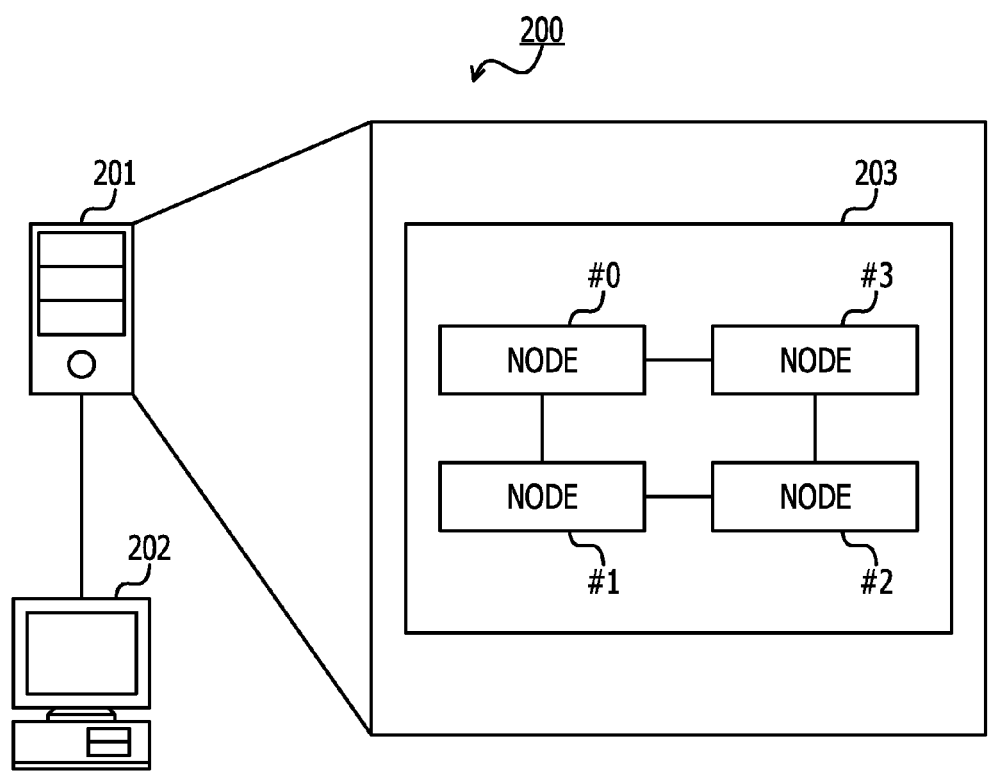
FIG. 2 is an explanatory diagram illustrating a coupling example of a server system.

FIG. 2 is an explanatory diagram illustrating a coupling example of the server system. A server system 200 is a system including a server 201 and a management terminal 202. The server 201 corresponds to the information processing apparatus 100 illustrated in FIG. 1.

The server 201 is an apparatus including a NUMA system 203. The NUMA system 203 corresponds to the system 101 illustrated in FIG. 1. The hardware configuration of the server 201 is described below in FIG. 3. The NUMA system 203 includes the nodes #0 to #3. The hardware configurations of the nodes #0 to #3 is described below in FIG. 5. The node #0 is directly coupled to the node #1 and the node #3. Further, the node #1 is directly coupled to the node #0 and the node #2. Further, the node #2 is directly coupled to the node #1 and the node #3. Further, the node #3 is directly coupled to the node #0 and the node #2. The cores and the memories included in the nodes #0 to #3 are described below in FIG. 5. The nodes #0 to #3 execute, as the virtual machines, virtual servers which are the virtual machines of the server that provides services or data to another computer. In the description below, it is described that the plurality of virtual machines executed on the NUMA system 203 all are virtual servers.

The management terminal 202 is an apparatus operated by an administrator of the server system 200. The hardware configuration of the management terminal 202 is described below in FIG. 4. Further, the server system 200 may not include the management terminal 202. When there is not the management terminal 202, the administrator of the server system 200 may directly operate the server 201.

Figure 3:
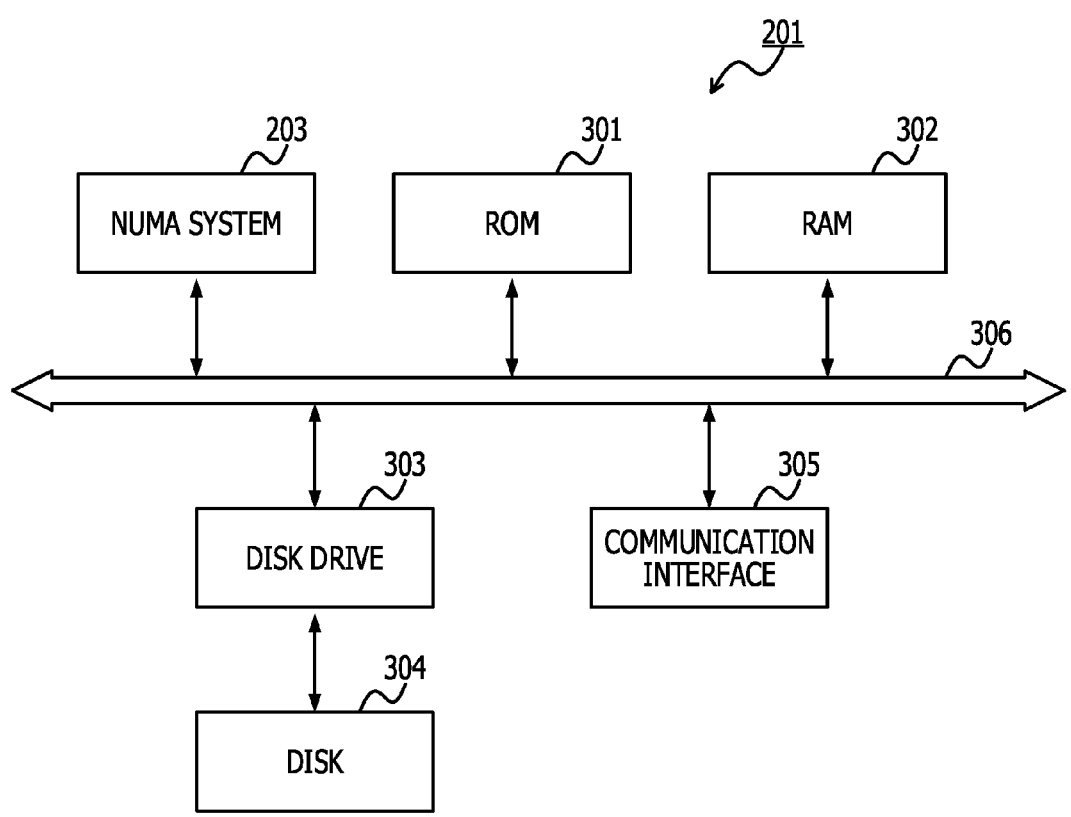
FIG. 3 is a block diagram illustrating a hardware configuration example of a server.

FIG. 3 is a block diagram illustrating a hardware configuration example of the server. In FIG. 3, the server 201 includes the NUMA system 203, a read only memory (ROM) 301, and a random access memory (RAM) 302. Further, the server 201 includes a disk drive 303, a disk 304, and a communication interface 305. Further, the NUMA system 203, the ROM 301, RAM 302, the disk drive 303, and the communication interface 305 are respectively coupled by a bus 306.

The NUMA system 203 is an arithmetic processing unit that manages the entire control of the server 201. The ROM 301 is a non-volatile memory that stores programs such as a boot program. The RAM 302 is a volatile memory used as a work area of the NUMA system 203.

The disk drive 303 is a control device that controls the reading and the writing of the data on the disk 304 according to the control of the NUMA system 203. For example, a magnetic disk drive or a solid-state drive may be employed for the disk drive 303. The disk 304 is a non-volatile memory that stores data written by the control of the disk drive 303. For example, if the disk drive 303 is a magnetic disk drive, a magnetic disk may be employed for the disk 304. Further, if the disk drive 303 is a solid-state drive, a semiconductor memory formed by a semiconductor element, so called a semiconductor disk, may be employed for the disk 304.

The communication interface 305 is a control device that is an interface between the internal and a network such as local area network (LAN), wide area network (WAN), or the Internet and controls the input and output of data from the other apparatuses. Specifically, the communication interface 305 is coupled to the management terminal 202 through a network. For example, a modem or a LAN adapter may be employed for the communication interface 305.

Further, if the operator of the server system 200 directly operates the server 201, the server 201 may include hardware such as a display, a keyboard, and a mouse.

Figure 4:
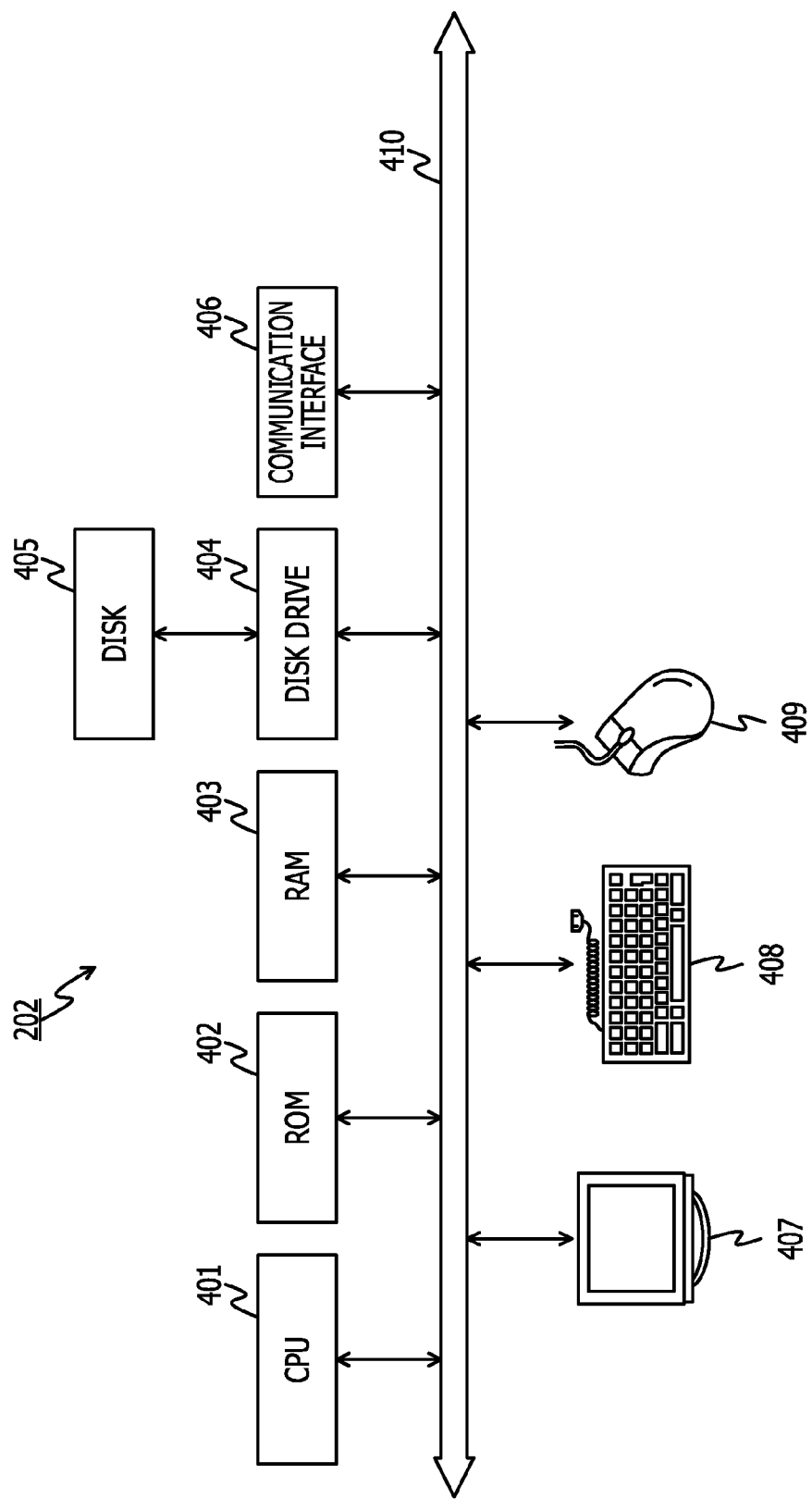
FIG. 4 is a block diagram illustrating a hardware configuration example of a management terminal.

FIG. 4 is a block diagram illustrating a hardware configuration example of the management terminal. The management terminal 202 includes a CPU 401, a ROM 402, and a RAM 403. Further, the management terminal 202 includes a disk drive 404, a disk 405, and a communication interface 406. Further, the management terminal 202 includes a display 407, a keyboard 408, and a mouse 409. Further, the CPU 401, the ROM 402, the RAM 403, and to the disk drive 404 are respectively coupled to the communication interface 406, the display 407, the keyboard 408, and the mouse 409 via a bus 410.

The CPU 401 is an arithmetic processing unit that manages the entire control of the management terminal 202. The ROM 402 is a non-volatile memory that stores programs such as a boot program. The RAM 403 is a volatile memory used as a work area of the CPU 401.

The disk drive 404 is a control device that controls the reading and writing of the data on the disk 405 according to the control of the CPU 401. For example, a magnetic disk drive, an optical disk drive, or a solid-state drive may be employed for the disk drive 404. The disk 405 is a non-volatile memory that stores data written by the control of the disk drive 404. For example, if the disk drive 404 is a magnetic disk drive, a magnetic disk may be employed for the disk 405. Further, if the disk drive 404 is an optical disk drive, and an optical disk may be employed for the disk 405. Further, if the disk drive 404 is a solid-state drive, a semiconductor memory formed by a semiconductor element, so called a semiconductor disk, may be employed for the disk 405.

The communication interface 406 is a control device that is an interface between the internal and network, and controls the input and output of the data from the external device. Specifically, the communication interface 406 is coupled to the server 201 through the network. For example, a modem and a LAN adapter are employed for the communication interface 406.

The display 407 is a device that displays data such as a document, an image, and functional information in addition to a mouse cursor, an icon, and a tool box. For example, a cathode ray tube (CRT), a thin film transistor (TFT) liquid crystal display, a plasma display are employed for the display 407.

The keyboard 408 is a device that has keys for inputting characters, a figure, various instructions, or the like, and for inputting data. Further, the keyboard 408 may be a touch panel-type input pad or a ten keypad. The mouse 409 is a device that moves the mouse cursor, selects a scope, moves a window, or changes a size of the window. The mouse 409 may be a trackball or a joystick as long as they have the same function as a pointing device.

Figure 5:
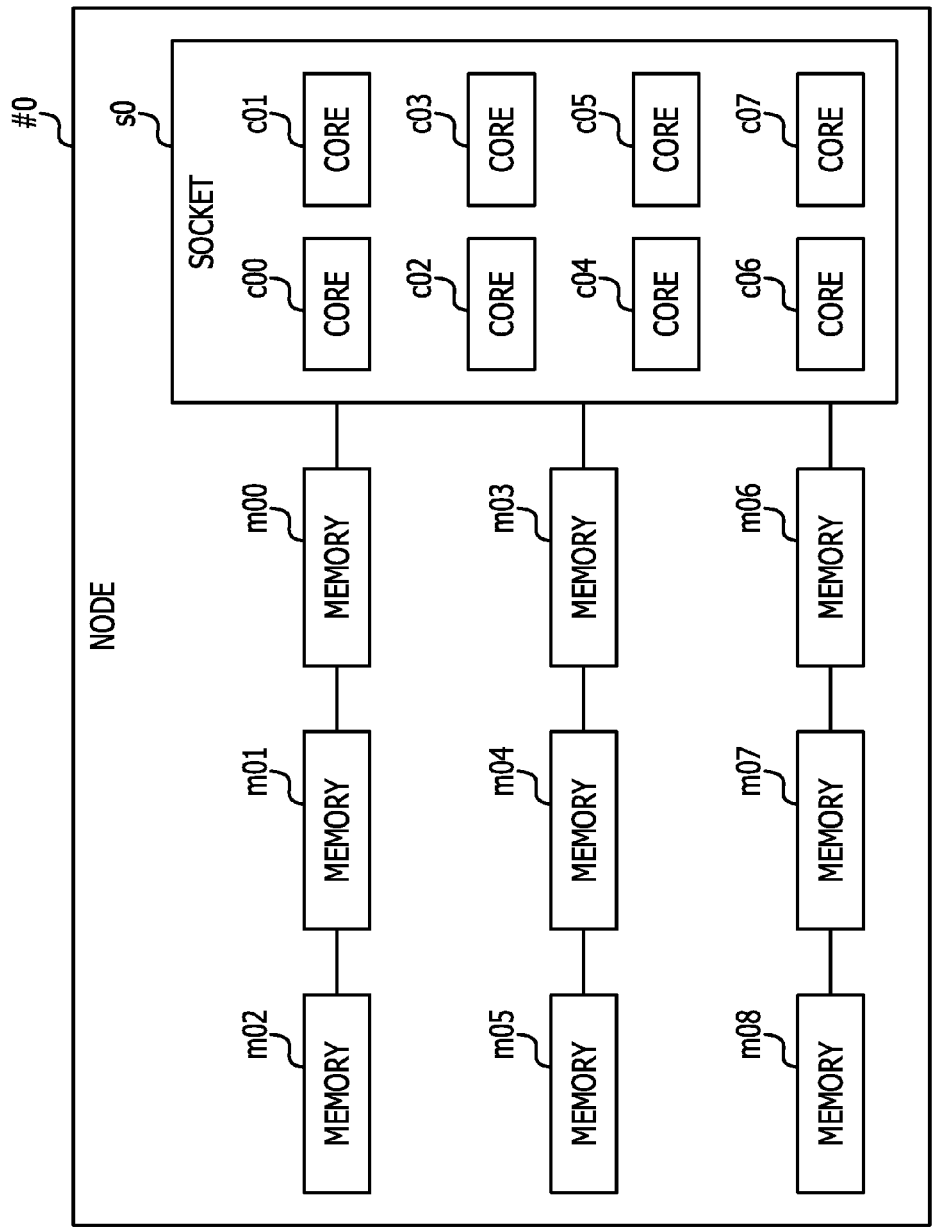
FIG. 5 is a block diagram illustrating a hardware configuration example of a node.

FIG. 5 is a block diagram illustrating a hardware configuration example of a node. In the example of FIG. 5, the hardware configuration of the node #0 is illustrated as an example of the node #0 among the plurality of nodes #0 to #3. In addition to the node #0, the nodes #1 to #3 have the same hardware configuration as the node #0.

The node #0 includes a socket s0, and memories m00 to m08. The socket s0 includes cores c00 to c07. The cores c00 to c07 are arithmetic processing units that manage the entire control of the node #0. The memories m00 to m08 are storing devices that store temporary data of the processes performed by the cores c00 to c07.

Here, symbols given to the cores and the memories included in the nodes #0 to #3 are formed with one alphabet character and a two-digit numerical value. Then, for simplicity of description, the value of the first digit among the values of the two digits of the symbol indicates the symbol of the node to which the memory or the core belongs. For example, a core c10 is the 0-th core included in the node #1. Further, for example, a memory m38 is an 8-th memory included in the node #3. According to the present embodiment, the performances of cores c00 to c37 are the same. In the same manner, memories m00 to m38 all have the same storage capacity.

(Function of the Server 201)

Figure 6:
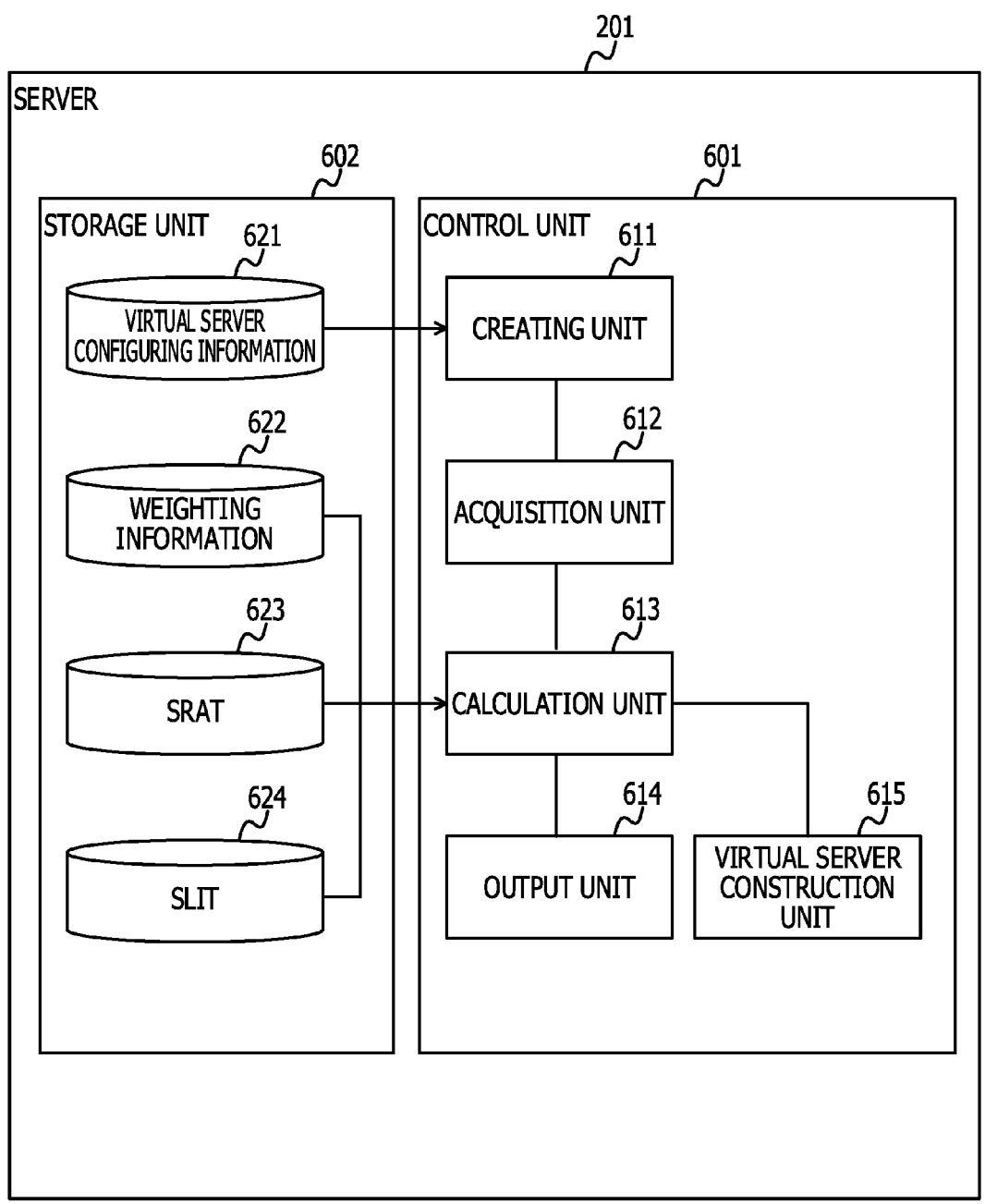
FIG. 6 is a block diagram illustrating a functional configuration of the server.

Next, the function of the server 201 is described. FIG. 6 is a block diagram illustrating a functional configuration example of the server. The server 201 includes a control unit 601 and a storage unit 602. The control unit 601 includes a creating unit 611, an acquisition unit 612, a calculation unit 613, an output unit 614, and a virtual server construction unit 615. The control unit 601 realizes the function of the control unit 601 by executing the programs stored in the storage device by a core of any of the nodes #0 to #3. Specifically, the storage device is, for example, the ROM 301, the RAM 302, or the disk 304 illustrated in FIG. 3. Further, the process result of the respective portions are stored in registers included in any of cores of the nodes #0 to #3 or memories of the nodes #0 to #3.

Further, the server 201 may access a virtual server configuring information 621, weighting information 622, a system resource affinity table (SRAT) 623, and a system locality distance information table (SLIT) 624. The virtual server configuring information 621, the weighting information 622, the SRAT 623, and the SLIT 624 are stored in the storage device such as the disk 304. An example of the storage content of the virtual server configuring information 621 is described below in FIG. 7. An example of the storage content of the weighting information 622 is described below in FIG. 8. The SRAT 623 is described below in FIG. 9. The SLIT 624 is described below in FIG. 10.

The creating unit 611 refers to the virtual server configuring information 621 that stores the number of cores and the number of memories to be used in the execution of the respective virtual servers, and creates the combination pattern 102 associated with the combination of the cores and the memories used in the execution of the respective virtual servers executed on the system. The specific example of creating the combination pattern 102 is described below in FIG. 11.

The acquisition unit 612 acquires the combination pattern 102 associated with the combination of the cores and the memories used in the execution of the respective virtual servers of the plurality of virtual servers executed on the NUMA system 203. Further, the acquisition unit 612 acquires the combination pattern 102 created by the creating unit 611. The example of acquiring the combination pattern 102 is described in FIG. 1.

The calculation unit 613 calculates the availability evaluation value of the plurality of virtual servers executed on the NUMA system 203 based on the number of virtual servers per node executed by using the cores and the memories included in the respective nodes in the combination pattern 102 acquired by the acquisition unit 612. Further, the calculation unit 613 may normalize the calculated availability evaluation values based on the number of the plurality of virtual servers. The specific example of calculating the availability evaluation values and the specific example of calculating the normalization are described in FIGS. 12A to 13B.

Additionally, the calculation unit 613 may calculate the values indicating the process performance of the plurality of virtual servers executed on the NUMA system 203 based on the access performance from the cores to the memory used in the execution of the respective virtual servers with respect to the combination pattern 102 acquired by the acquisition unit 612. Hereinafter, the values indicating the process performance are simply referred to as a "process performance evaluation value". The method of specifying the access performance from the core to the memory used in the execution of the respective virtual servers may be specified by referring to the SRAT 623 and the SLIT 624. Further, the calculation unit 613 may normalize process performance evaluation values calculated based on the maximum value and the minimum value of the access performance from the cores to the memories included in the plurality of nodes. The specific example of calculating process performance evaluation values and the specific example of calculating the normalization are described below in FIGS. 14A to 15B.

Further, the calculation unit 613 may calculate the value obtained by adding a value obtained by weighting either of the normalized availability evaluation value or the normalized process performance evaluation value and the other value. Hereinafter, the summed-up value is referred to as an "allocation evaluation value". The weighting coefficient may be specified from the weighting information 622.

The output unit 614 outputs a value obtained by associating the availability evaluation value calculated by the calculation unit 613 with the combination pattern 102 acquired by the acquisition unit 612. Further, the output unit 614 may output a value obtained by associating the process performance evaluation value calculated by the calculation unit 613 with the combination pattern 102 acquired by the acquisition unit 612. Further, the output unit 614 may output a value obtained by associating the allocation evaluation value calculated by the calculation unit 613 with the combination pattern 102 acquired by the acquisition unit 612.

The virtual server construction unit 615 constructs the plurality of virtual servers according to the combination pattern 102 selected based on the allocation evaluation value calculated by the calculation unit 613. For example, the virtual server construction unit 615 constructs the plurality of virtual servers according to the combination pattern 102 in which the allocation evaluation value is maximized. The virtual server construction unit 615 corresponds to VMM which is software that virtualizes a computer and enables a plurality of different operating systems (OS) to be executed in parallel. The virtual server construction unit 615 is software that directly operates on hardware, and causes all the OSs executed on the server 201 to be virtual machines. Further, the virtual server construction unit 615 is application software that operates on a certain OS, and may be software for operating various virtual machines on the application software.

Next, the virtual server configuring information 621, the weighting information 622, the SRAT 623, and the SLIT 624 are described with reference to FIGS. 7 to 10.

Figure 7:
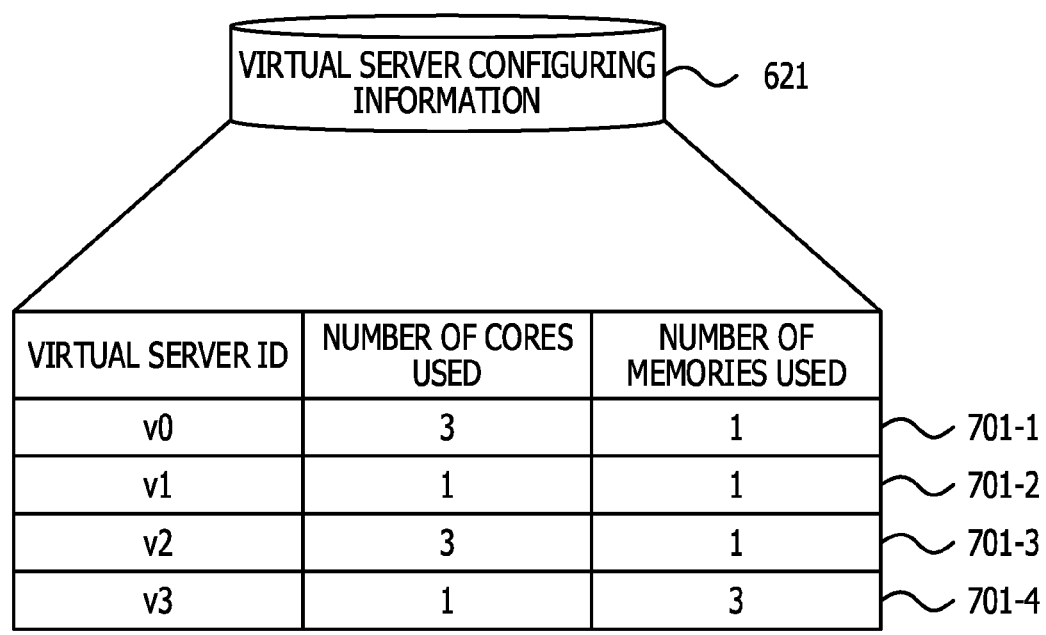
FIG. 7 is an explanatory diagram illustrating an example of virtual server configuring information.

FIG. 7 is an explanatory diagram illustrating an example of the virtual server configuring information. The virtual server configuring information 621 is information for storing the numbers of cores and memories to be used in the execution of the respective virtual servers. The virtual server configuring information 621 illustrated in FIG. 7 includes records 701-1 to 4. The virtual server configuring information 621 includes three fields of a virtual server ID, the number of cores used, and the number of memories used. The information for specifying a virtual server is stored in the field of the virtual server ID. The number of cores used for the operation of the virtual server is stored in the field of the number of cores used. The number of memories used for the operation of the virtual server is stored in the field of the number of memories used.

Here, the unit of memory is one dual inline memory module (DIMM) included in the nodes #0 to #3. Further, when the nodes #0 to #3 perform interleaving or memory mirroring, the unit of the memory is a DIMM group formed from the minimum number of DIMMs for forming continuous memory addresses. For example, the DIMM group when memory mirroring is formed by two DIMMs has two DIMMs. Here, the unit of the memory is two DIMMs.

For example, the record 701-1 indicates that three cores and one memory are used to execute the virtual server v0.

Figure 8:
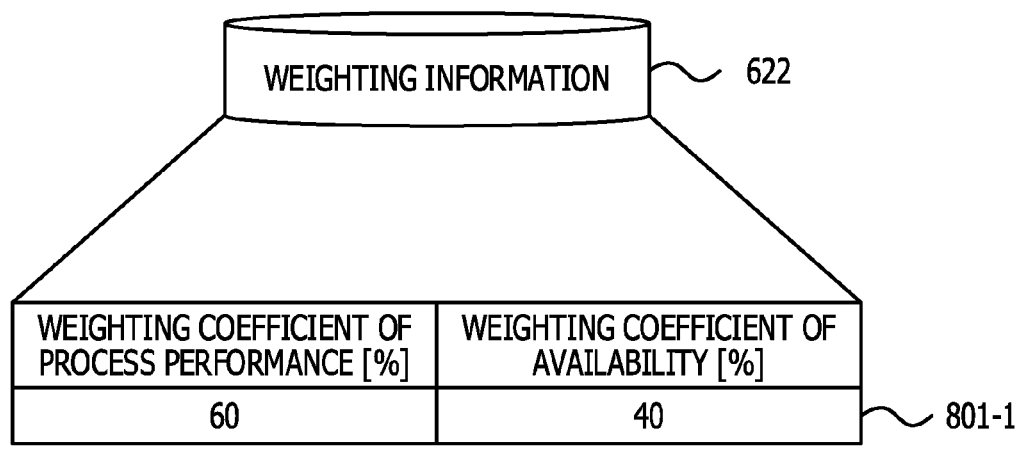
FIG. 8 is an explanatory diagram illustrating an example of weighting information.

FIG. 8 is an explanatory diagram illustrating an example of the weighting information. The weighting information 622 is information including the weighting coefficient of either of the availability evaluation value or the process performance evaluation value. Further, the weighting information 622 may include weighting coefficients of both of the availability evaluation value and the process performance evaluation value. The weighting information 622 illustrated in FIG. 8 has a record 801-1. The weighting information 622 includes two fields of the weighting coefficient of the process performance and the weighting coefficient of the availability. The weighting coefficient according to the process performance evaluation value is stored in the weighting coefficient field of the process performance. The weighting coefficient according to the availability evaluation value is stored in the weighting coefficient field of the availability.

For example, the record 801-1 indicates that the weighting coefficient of the process performance is 60%, and the weighting coefficient of the availability is 40%.

Next, the SRAT 623 and the SLIT 624 used to obtain the process performance evaluation value are described with reference to FIGS. 9 and 10. Here, the SRAT 623 and the SLIT 624 are table formats defined by the advanced configuration and power interface (ACPI).

Figure 9:
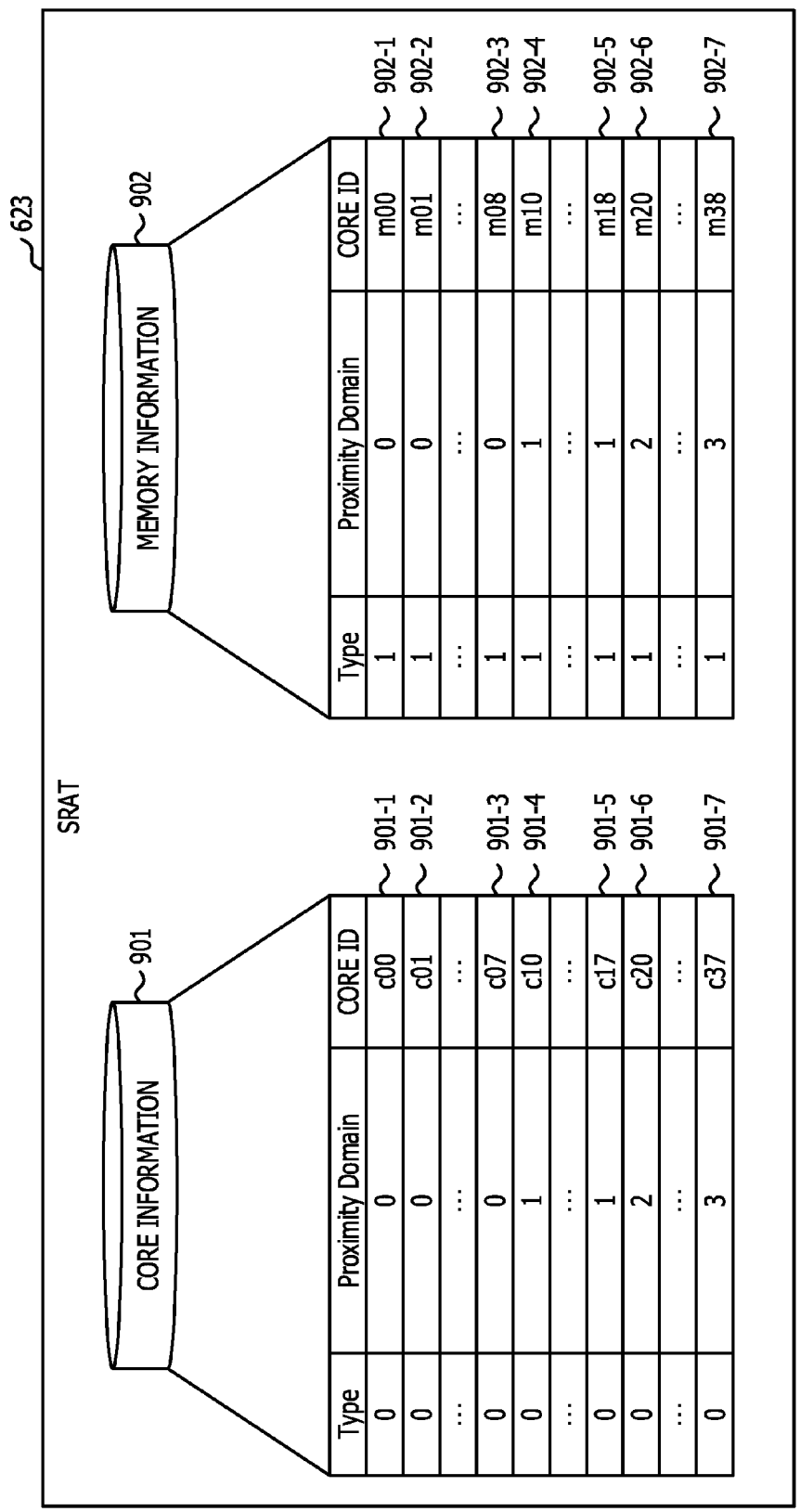
FIG. 9 is an explanatory diagram illustrating a portion of an SRAT.

FIG. 9 is an explanatory diagram illustrating a portion of SRAT. The SRAT 623 is a table that regulates the information relating to the cores and information relating to the memories which are included in the NUMA system 203. All the fields defined by the SRAT 623 are disclosed on pages 151 to 155 (file pages 187 to 191) of Advanced Configuration and Power Interface Specification Revision 5.0 Errata A (Reference Document 1).

The information relating to the core is information defined by processor local advanced programmable interrupt controller (APIC)/streamlined advanced programmable interrupt controller (SAPIC) affinity structure described in Reference Document 1. Hereinafter, the information according to the Processor Local APIC/SAPIC Affinity Structure is defined as "core information of the ACPI standard". Further, the information relating to the memory is information defined by the Memory Affinity Structure described in Reference Document 1. Hereinafter, the information according to the Memory Affinity Structure is defined as "memory information of the ACPI standard". Here, for simplicity of description, the information including a field used in the present embodiment based on the core information of the ACPI standard is defined as the core information 901. In the same manner, information including the field used in the present embodiment based on the memory information of the ACPI standard is defined as the memory information 902.

One of the respective records of the SRAT 623 is either of core information 901 or memory information 902. Among the records illustrated in FIG. 9, records 901-1 to 901-7 are the core information 901, and records 902-1 to 902-7 are the memory information 902.

The core information 901 includes three fields of a type, a proximity domain, and a core identification (ID). An identifier illustrating which of the target record is the core information 901 or the memory information 902 is stored in the field of the type of the core information 901. The identifier of "0" indicates that the target record is the core information 901. The identifier of "1" indicates that the target record is the memory information 902.

Information for specifying a node to which the core indicated by the target record belongs is stored in the field of the proximity domain of the core information 901. Here, the field of the proximity domain of the core information 901 corresponds to a field indicating the data of 0 to 7 bits and a field indicating the data of 8 to 31 bits of the proximity domain in the core information of the ACPI standard. Further, for simplicity of description, symbols of the nodes to which the cores belong are stored in the field of the proximity domain of the core information 901.

The information for identifying the cores indicated by the target record is stored in the field of the core ID. Here, the field of the core ID corresponds to a field obtained by combining the field of APIC ID and the field of Local SAPIC EID of the Processor Local APIC in the core information of the ACPI standard. Here, for simplicity of description, the symbol of the core is stored in the field of the core ID.

For example, the record 901-1 indicates that a core c00 is included in the node #0. Further, the record 901-7 indicates that a core c37 is included in the node #3.

The memory information 902 includes three fields of a type, a proximity domain, and a memory ID. The definition of the field of the type of the memory information 902 is the same as that of the field of the type of the core information 901, so the description thereof is omitted.

Information for specifying the nodes to which the memory indicated by the target record belongs is stored in the field of the proximity domain of the memory information 902. Here, the field of the proximity domain of the memory information 902 corresponds to the field of the proximity domain of the memory information of the ACPI standard. Further, for simplicity of description, it is assumed that the symbol of the node to which the memory belongs is stored in the field of the proximity domain of the memory information 902.

Information for identifying the memory in the NUMA system 203 indicated by the target record is stored in the field of the memory ID. Here, the information of the field of the memory ID is specified from information obtained by combining the information on the Base Address Low field and the information on the Base Address High field of the memory information of the ACPI standard. Specifically, the base address which is the information obtained by combining the information on the Base Address Low field and the information on the Base Address High field is unique to the respective memories in the NUMA system 203, and may identify the memories. Further, for simplicity of description, the symbols of the memories in the NUMA system 203 are stored in the field of the memory ID.

For example, a record 902-1 indicates that a memory m00 is included in the node #0. Further, a record 902-7 indicates that the memory m38 is included in the node #3.

FIG. 10 is an explanatory diagram illustrating a portion of the SLIT. The SLIT 624 is a table for storing a distance between nodes. Here, the distance according to the present embodiment refers to relative access time when the access time from a core to a memory in the same node is set to be 10. The entire field defined by the SLIT 624 is described in Reference Document 1. The SLIT 624 illustrated in FIG. 10 describes the fields used in the present embodiment. The SLIT 624 illustrated in FIG. 10 includes a field of the number of system localities and a field of the entry. The SLIT 624 illustrated in FIG. 10 includes records 1001-1 and 1001-2.

The number of nodes included in the NUMA system 203 is stored in the field of the number of system localities. The respective distances between nodes are stored in the field of the entry. As many of the fields of the entry exist as the square of the value stored in the number of system localities. Further, in the SLIT 624, the distance in the node is set to be 10, and the distance between a certain node and the other node is indicated as a relative value of the distance in the basis of 10.

For example, a record 1001-1 indicates that the number of nodes included in the NUMA system 203 is 4. Further, a record 1001-2 indicates that the distance between the node #0 and the node #0 is 10.

According to the present embodiment, in order to simply calculate the process performance evaluation value, the calculation is performed by using the value obtained by subtracting 10 from the value of the field of the entry of the SLIT 624. The table for storing the value obtained by subtracting 10 from the value of the field of the entry of the SLIT 624 is set to be a distance table 1002. Before calculating the process performance evaluation value, the server 201 may create the distance table 1002 from the SLIT 624, store the distance table 1002 in the storage area such as the RAM 302 or the disk 304, and calculate the process performance evaluation value by referring to the distance table 1002. In addition, whenever the server 201 refers to the distance between the nodes when the process performance evaluation value is calculated, the server 201 may subtract 10 from the value of the field of the entry of the SLIT 624, and calculate the process performance evaluation value by using the subtracted value. According to the present embodiment, before the process performance evaluation value is calculated, the distance table 1002 is created from the SLIT 624.

For example, the distance table 1002 includes records 1002-1 to 1002-17. For example, the record 1002-2 indicates that the distance between the node #0 and the node #0 when the process performance evaluation value is calculated is 0. Further, the record 1002-3 indicates that the distance between the node #0 and the node #1 is 2 when the process performance evaluation value is calculated. Further, the record 1002-4 indicates that the distance between the node #0 and the node #2 is 5 when the process performance evaluation value is calculated.

Next, an example of creating the plurality of combination patterns and an example of calculating the availability evaluation value and the process performance evaluation value of the respective combination patterns are described with reference to FIGS. 11 to 15.

FIG. 11 is an explanatory diagram illustrating a creation example of the plurality of combination patterns. In FIG. 11, an example for creating a plurality of combination patterns by using the virtual server configuring information 621 is illustrated. The server 201 creates all the combination patterns of the cores and all the combination patterns of the memories, and creates combination patterns from all the combination patterns of the cores and all the combination patterns of the memories.

Hereinafter, the combination pattern of the cores is simply referred to as a "core pattern". Further, the combination pattern of the memories is simply referred to as a "memory pattern". Additionally, a y-th core of a virtual server vx is referred to as a "core vx_cy", and is simply referred to as "vx_cy" in FIG. 11. Further, a z-th memory of the virtual server vx is referred to as a "memory vx_mz", and is simply referred to as "vx_mz" in FIG. 11. Here, x is an integer from 0 to 3. y is an integer from 0 to 7. z is an integer from 0 to 8.

Here, the core patterns are permutations for selecting the core used in the execution by the virtual server from all the cores in the NUMA system 203. In the same manner, the memory patterns are permutations for selecting the memory used in the execution by the virtual server from all the memories in the NUMA system 203.

A list of core patterns is indicated in a table 1101 illustrated in FIG. 11. The core patterns of the virtual servers v0 to v3 executed on the NUMA system 203 are permutations for extracting the number of cores used in the execution by the virtual servers v0 to v3 from all the cores in the NUMA system 203. Since the number of all the cores in the NUMA system 203 is 8×4=32, and the number of cores used in the execution by the virtual servers v0 to v3 is 3+1+3+1=8, the server 201 creates $_{32}P_8$ permutations. The created result is the table 1101. The table 1101 illustrated in FIG. 11 indicates, for example, records 1101-1 to 1101-4.

For example, the record 1101-1 indicates that cores used in the execution of the virtual servers v0 to v3 by a core pattern cp1 are respectively cores c00 to c02, a core c03, cores c04 to c06, and a core c07.

Here, when the number of cores used in the execution of one virtual server is equal to or greater than 2, among the created core patterns, core patterns used in the execution of cores of which the orders are different but which have the same virtual server are included. For example, in the record 1101-1 and the record 1101-3, the cores used in the execution by the virtual server other than the virtual server v0 are the same. Then, the cores used in the execution of the virtual server v0 indicated by the record 1101-1 are the cores c00 and c01, and c02, and the cores used in the execution of the virtual server v0 indicated by the record 1101-3 are the cores c01, c00, and c02. According to the above, the record 1101-1 and the record 1101-3 indicate core patterns used in the execution of the cores of which the orders are different but which have the same virtual server. Accordingly, since the record 1101-3 indicates a redundant core pattern, the server 201 deletes the record 1101-3. The result obtained by deleting the redundant records is a table 1102.

A table 1103 illustrated in FIG. 11 indicates a list of memory patterns. The memory patterns of the virtual servers v0 to v3 executed on the NUMA system 203 are permutations extracting the number of memories used in the execution of the virtual servers v0 to v3 from all the memories in the NUMA system 203. Since a method of creating the memory patterns is the same as the method of creating the core patterns, the description thereof is omitted. The server 201 deletes the redundant records with respect to the memory patterns. The result obtained by deleting the redundant records is a table 1104.

After creating the core patterns and the memory patterns in which the redundant records are deleted, the server 201 obtains combination patterns by the direct product of the core patterns and the memory patterns. Here, the direct product is the arithmetic operation that obtains all the combinations extracted from two sets. For example, it is assumed that there are a set A (a1, a2, . . . , am) of which the number of elements is m and a set B (b1, b2, . . . , bn) of which the number of elements is n. Here, the direct products of the set A and the set B are (a1b1, a1b2, . . . , a1bn, a2b1, a2b2, . . . , a2bn, . . . , amb1, amb2, . . . , ambn). Further, the number of elements of the direct product of the set A and the set B is m×n.

A table 1105 illustrated in FIG. 11 indicates the result in which the server 201 performs the direct product of the table 1102 and the table 1104. The table 1105 illustrated in FIG. 11 has records 1105-1 to 1105-6. For example, the record 1105-1 indicates a combination pattern p1, and is a combination between the record 1101-1 and the record 1103-1. Further, for example, the record 1105-2 indicates a combination pattern p2, and is a combination of the record 1101-1 and the record 1103-2.

Further, one record of the table 1105 corresponds to the combination pattern. For example, the record 1105-1 is the information associated with the combination of the cores and the memories used in the execution of the virtual servers v0 to v3. Specifically, the record 1105-1 is the information associated with (the core c00 to c02, the memory m00), (the core c03, the memory m01), (the cores c04 to c06, the memory m02), and (the core c07, the memories m03 to m05).

Next, a calculation example of the availability evaluation values in combination patterns px and py indicated by the records 1105-5 and 1105-6 illustrated in FIG. 11 and a normalization example of the availability evaluation value are described with reference to FIGS. 12A to 13B. Further, the calculation example of the process performance evaluation value in the combination patterns px and py and the normalization example of the process performance evaluation value are described with reference to FIGS. 14A to 15B.

Figure 12A:
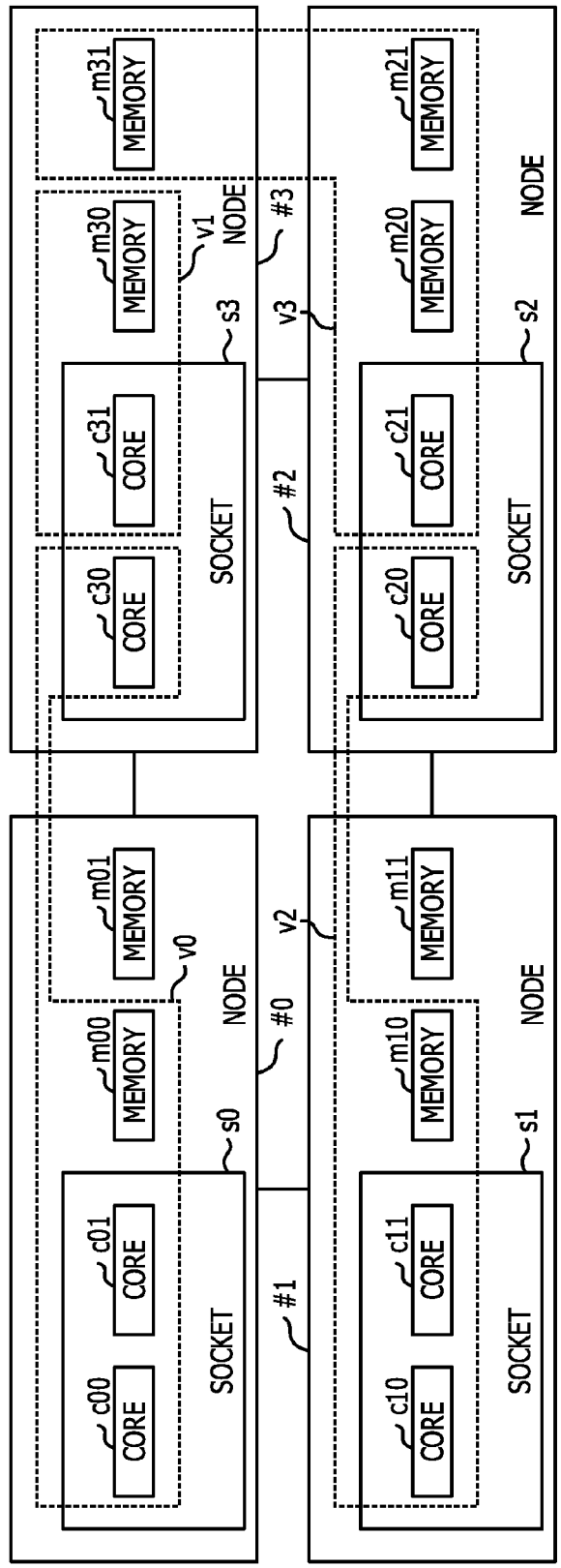
FIGS. 12A and 12B are explanatory diagrams (first) illustrating a calculation example of availability evaluation values.
Figure 12B:
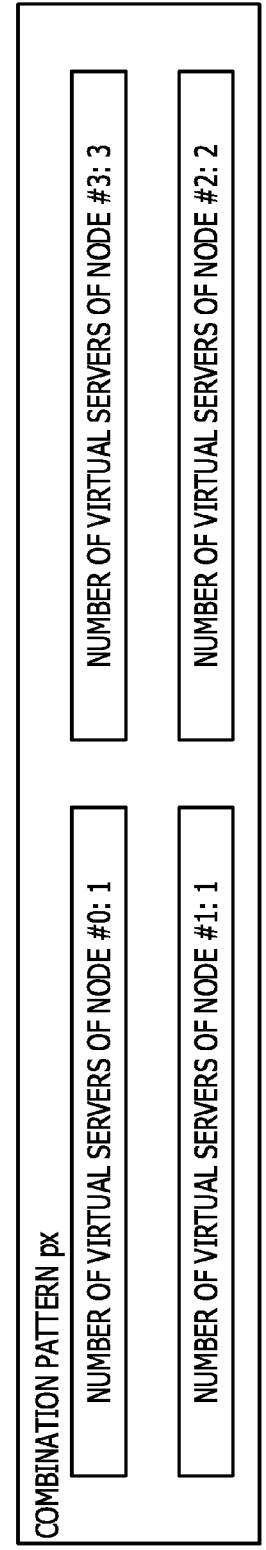
Figure 13A:
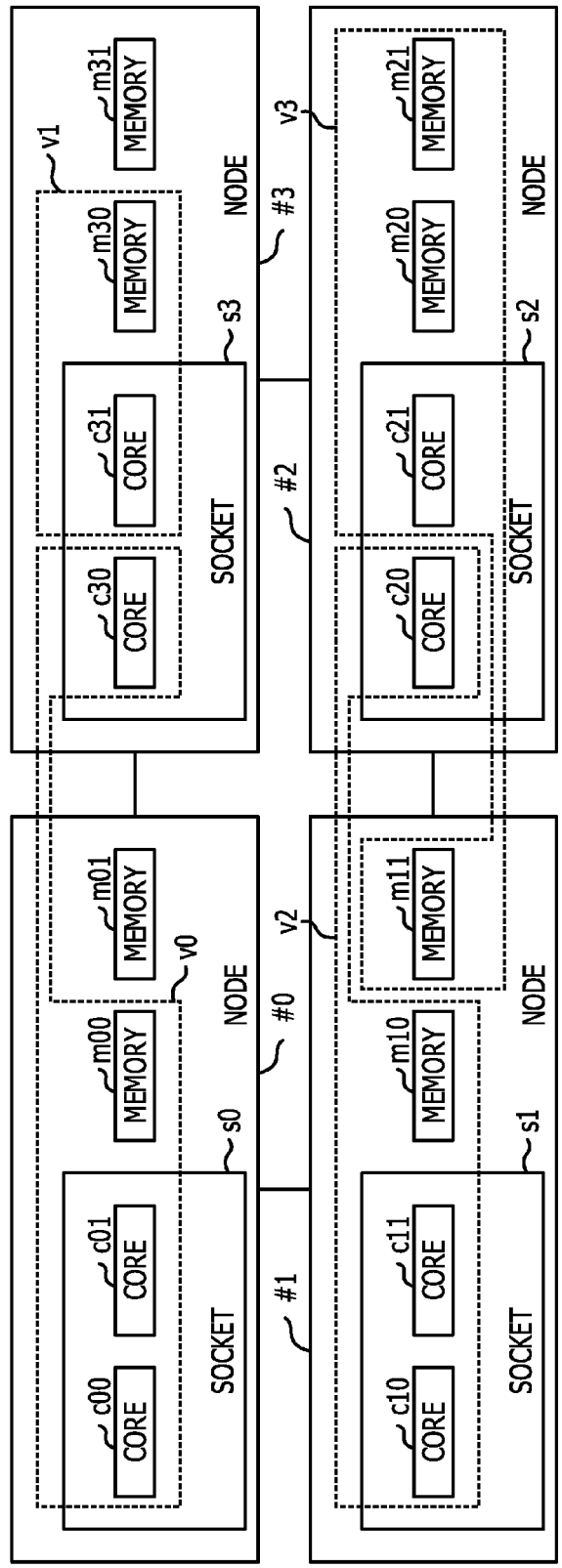
FIGS. 13A and 13B are explanatory diagrams (second) illustrating a calculation example of availability evaluation values.
Figure 13B:
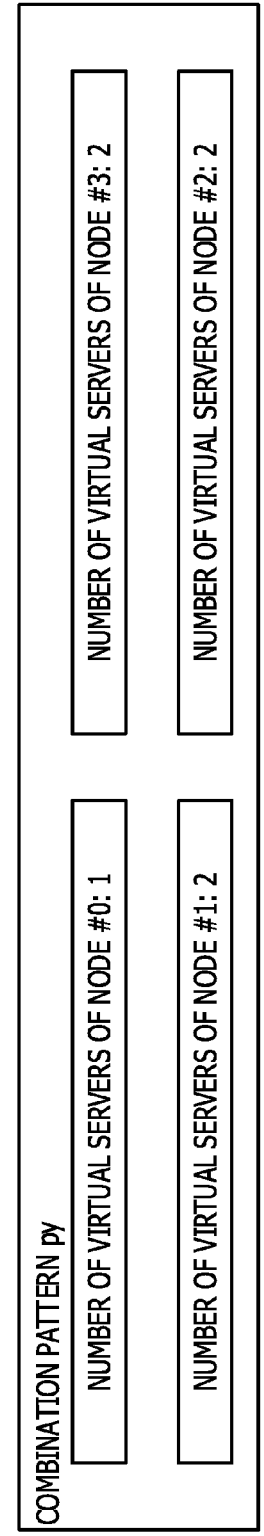

FIGS. 12A and 12B are explanatory diagrams (first) illustrating a calculation example of availability evaluation values. Further, FIGS. 13A and 13B are explanatory diagrams (second) illustrating a calculation example of availability evaluation values. In FIGS. 12A and 12B, as the calculation example of the availability evaluation values, the availability evaluation values of the combination pattern px are calculated. Further, in FIGS. 13A and 13B, the availability evaluation values of the combination pattern py are calculated.

In order to calculate the availability evaluation value, first, the server 201 counts the number of virtual servers of the respective nodes. Next, the server 201 calculates the maximum value of the number of virtual servers by using Equation (1) below.

$$\text{A maximum value of the number of virtual servers} = \text{Max}(\text{the number of virtual servers of the node } \#0, \ldots, \text{the number of virtual servers of a node } \#(N-1)) \quad (1)$$

The maximum value of the number of virtual servers is an example of the availability evaluation values. As the availability evaluation values other than the maximum value of the number of virtual servers, for example, the server 201 may set the distribution value or the standard deviation of the number of virtual servers of the respective nodes, as the availability evaluation value. Further, Max( ) is a function of outputting the maximum value among coefficients. Further, N is a total number of nodes.

Subsequently, the server 201 outputs normalized availability evaluation values by using a normalization function fa( ) of the availability evaluation values. For example, the function fa( ) is Equation (2) as below.

$$fa(\text{availability evaluation value}) = 1 - (\text{availability evaluation value} - 1)/(\text{coefficients of virtual servers of combination patterns} - 1) \quad (2)$$

The function fa( ) is a function of mapping values obtainable from the availability evaluation values to a scope of [0, 1]. The minimum value obtainable from the availability evaluation values is 1, and the maximum value obtainable from the availability evaluation values is the number of virtual servers of the combination pattern. That is, the function fa( ) is a monotonic decrease, and may be any functions as long as the function is 1 when the availability evaluation values are the minimum value which is 1, and the function is 0 when the availability evaluation values are the maximum value which is the number of virtual servers of the combination pattern. Equation (2) is substantially identical to the equation when a and b are obtained by substituting (availability evaluation value, fa(availability evaluation value))=(1,1), (the number of virtual servers of combination pattern, 0) for fa(availability evaluation value)=a×availability evaluation value+b indicated by using coefficients a and b. As another example of the function fa( ), the server 201 may obtain a coefficient a by substituting (availability evaluation value, fa(availability evaluation value))=(the number of virtual servers of combination pattern, 0) for fa(availability evaluation value)=a×(availability evaluation value−1)^2+1 indicated by using the coefficient a.

Further, the maximum value obtainable from the availability evaluation values depends on the method of calculating the availability evaluation values. If the availability evaluation value is the maximum value of the number of virtual servers of the respective nodes, the maximum value obtainable from the availability evaluation values is identical to the number of the virtual servers of the combination pattern. Further, for example, if the availability evaluation value is the distribution value of the number of virtual servers of the respective nodes, the maximum value obtainable from the availability evaluation values is 0.25×(the number of virtual servers of the combination pattern)^2.

Here, an example of calculating normalized availability evaluation values is described with reference to the combination pattern px illustrated in FIGS. 12A and 12B. FIG. 12A indicates a state of allocating the virtual servers v0 to v3 when being executed in the plurality of nodes #0 to #3 on the combination pattern px. Further, FIG. 12B indicates the number of virtual servers in the respective nodes on the combination pattern px. For example, since the node #0 includes the cores c00 and c01 included in the node #0 and the virtual server v0 used in the execution of the memory m00, the number of virtual servers in the node #0 is 1. The state in which the cores c00 and c01 and the memory m00 belong to the node #0 are specified by the record 901-1, the record 901-2, and the record 902-1 found by searching the core information 901 and the memory information 902 based on the core ID and the memory ID, respectively.

The server 201 calculates the maximum value of the number of virtual servers by using Equation (1).

Maximum value of the number of virtual servers=Max(1,1,2,3)=3

Next, the server 201 sets the maximum value of the number of virtual servers to be the availability evaluation value, and normalizes the availability evaluation values by using Equation (2).

$fa(3)=1-(3-1)/(4-1)=0.33$

In the same manner, an example of calculating the normalized availability evaluation value with reference to the combination pattern py indicated by FIGS. 13A and 13B is described. FIG. 13A indicates an allocation state of the virtual servers v0 to v3 when being executed in the plurality of nodes #0 to #3 on the combination pattern py. Further, FIG. 13B indicates the number of virtual servers on the combination pattern py.

The server 201 calculates the maximum value of the number of virtual servers by using Equation (1).

Maximum value of the number of virtual servers=Max(1,2,2,2)=2

Next, the server 201 sets the maximum value of the number of virtual servers to be an availability evaluation value, and normalizes the availability evaluation value by using Equation (2).

$fa(2)=1-(2-1)/(4-1)=0.67$

Figure 14A:
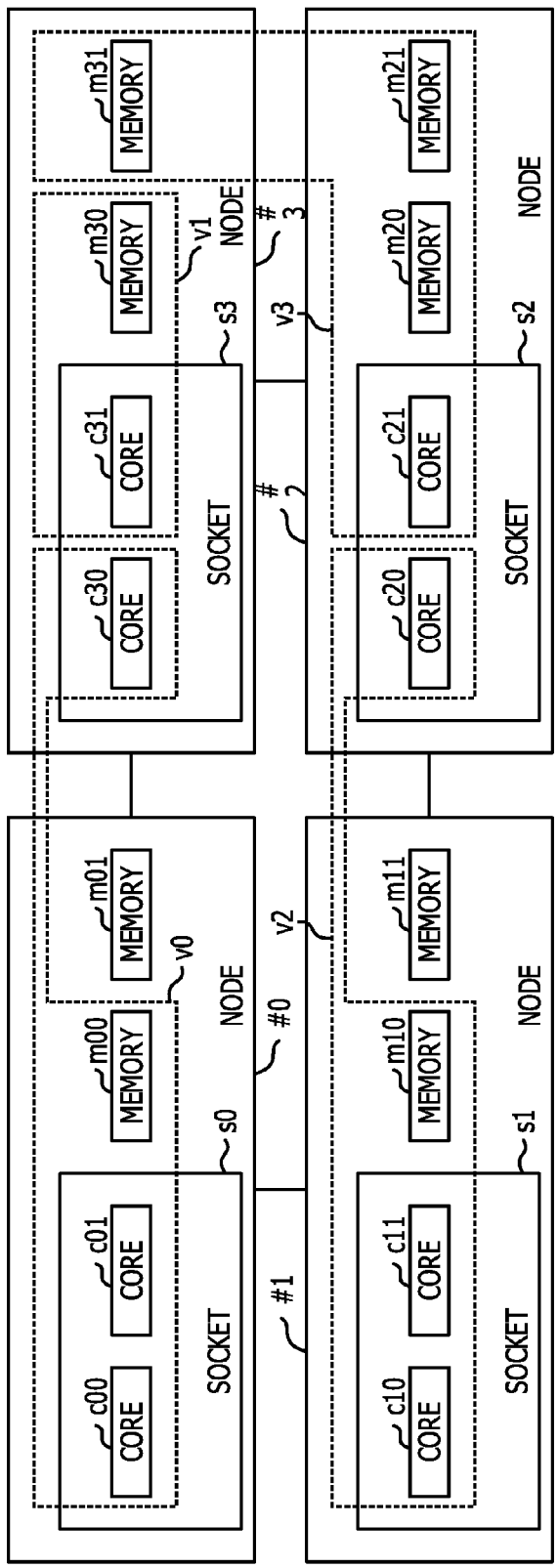
FIGS. 14A and 14B are explanatory diagrams (first) illustrating a calculation example of process performance evaluation values.
Figure 14B:
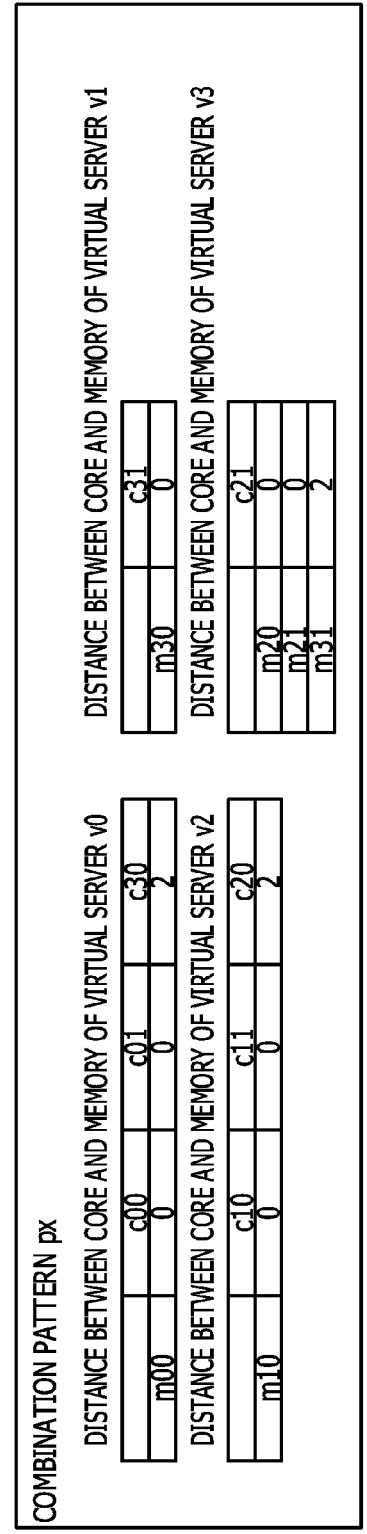
Figure 15A:
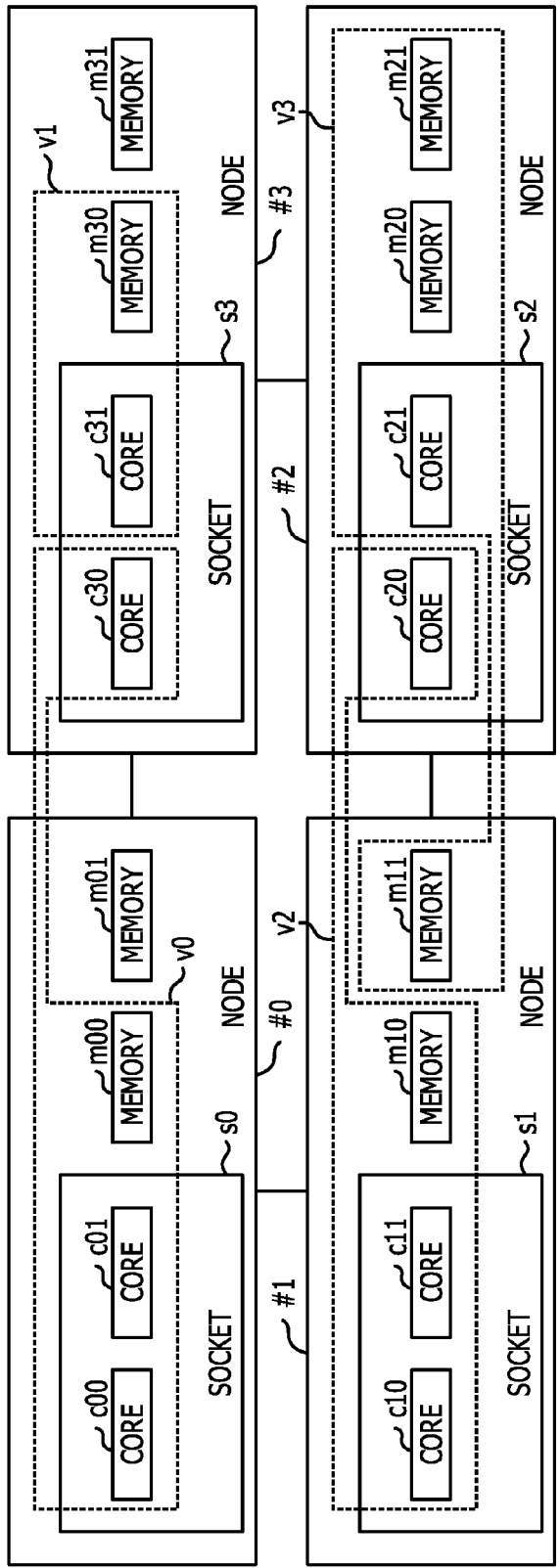
FIGS. 15A and 15B are explanatory diagrams (second) illustrating a calculation example of the process performance evaluation values.
Figure 15B:
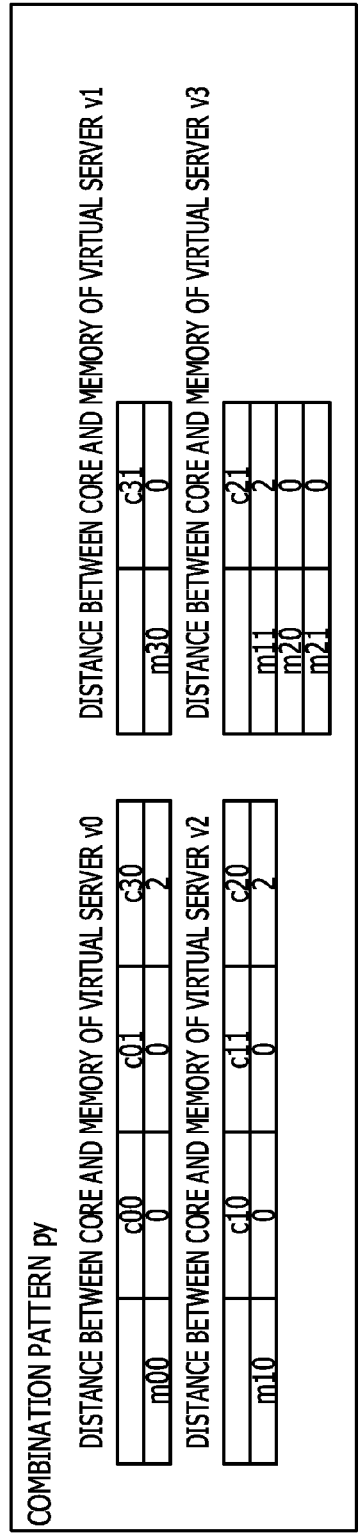

FIGS. 14A and 14B are explanatory diagrams (first) illustrating calculation examples of process performance evaluation values. Further, FIGS. 15A and 15B are explanatory diagrams (second) illustrating calculation examples of the process performance evaluation values. FIGS. 14A and 14B illustrate examples of calculating and normalizing the process performance evaluation value of the combination pattern px, as the calculation examples of the process performance evaluation value. Further, FIGS. 15A and 14B illustrate an example of calculating and normalizing the process performance evaluation value of the combination pattern py.

In order to calculate the process performance evaluation value, the server 201 first calculates the sum of distances of the combination patterns by Equation (3) below.

A sum of distances of combination patterns=(A sum of distances between cores and memories of the virtual server v0 in the combination pat-terns)+(A sum of distances between cores and memories of the virtual server v1 in the combination pattern)+ . . . +(A sum of distances between cores and memories of a virtual server v(M−1) in the combination pattern) (3)

However, M is a total number of virtual servers. Further, with respect to the distances between cores and memories of the virtual servers, the server 201 refers to the distance table 1002, and specifies distances between the nodes to which the cores belong and the nodes to which the memories belong as distances between the cores and the memories of virtual servers. Next, the server 201 calculates an average value of the distances by Equation (4) below.

An average value of distances=a sum of distances of the combination pattern/the number of combinations of cores and memories of the virtual servers included in the combination pattern (4)

The average value of the distances is an example of the process performance evaluation value. As the process performance evaluation value other than the average value of the distances, for example, the server 201 may calculate the maximum value of the distances between the cores and the memories in the combination pattern as the process performance evaluation value.

The server 201 calculates the normalized process performance evaluation value by using a normalization function fp( ) of the process performance evaluation value. The function fp( ) is, for example, Equation (5) below.

$fp$(a process performance evaluation value)=1−a process performance evaluation value/the maximum value of distances in the distance table 1002 (5)

The function fp( ) is a function of mapping a value obtainable from the process performance evaluation value to a scope of [0, 1]. The minimum value obtainable from the process performance evaluation value is an access performance from the cores of a certain node to the memories of the same nodes, and is 0 referring to the distance table 1002. The maximum value obtainable from the process performance evaluation value is the maximum value of the distances in the distance table 1002. That is, the function fp( ) is a monotonic decrease, and may be any function as long as the function is 1 when the value obtainable from the process performance evaluation value is minimum, which is 0, and the function is 0 when the value obtainable from the process performance evaluation value is maximum, which is the process performance evaluation value/the maximum value of the distances in the distance table 1002. Equation (5) is substantially identical to the equation when a and b are obtained by substituting (process performance evaluation value, fp(process performance evaluation value))=(0,1), (the maximum value of the distances in the distance table 1002, 0) for fp(process performance evaluation value)=a×process performance evaluation value+b indicated by using the coefficients a and b. As another example of the function fp( ), the server 201 may obtain the coefficient a by substituting (process performance evaluation value, fp(process performance evaluation value))=(the maximum value of distances in the distance table 1002, 0) for fp(process performance evaluation value)=a×process performance evaluation value^2+1 by using the coefficient a.

Here, an example of calculating the normalized process performance evaluation value is described with reference to the combination pattern px illustrated in FIGS. 14A and 14B. FIG. 14A illustrates the allocation state of the virtual servers v0 to v3 when being executed in the plurality of nodes #0 to #3 on the combination pattern px. Further, FIG.

14B illustrates a list of distances between the cores and the memories of the virtual servers v0 to v3 on the combination pattern px. The distances between the cores and the memories of the virtual servers v0 to v3 are specified with reference to the SRAT 623 and the distance table 1002. For example, with respect to a distance between the core c00 and the memory m00 of the virtual server v0, the server 201 first specifies the record 901-1 corresponding to the core c00 and the record 902-1 corresponding to the memory m00. Then, the server 201 obtains "0" which is the distance between the core c00 and the memory m00 by referring to the record 1002-2 in which the distance of Entry[0][0] is stored.

The server 201 calculates the sum of the distances of the combination pattern px using Equation (3).

Sum of the distances of the combination pattern=(0+0+2)+(0)+(0+0+2)+(0+0+2)=6

Next, the server 201 calculates the average value of the distances by using Equation (4).

The average value of the distances=6/10=0.6

Subsequently, the server 201 sets the average value of the distances to be the process performance evaluation value, and normalizes the process performance evaluation value by using Equation (5). Further, the maximum value of the distance table 1002 is 5.

$fp(0.6)=1-0.6/5=0.88$

In the same manner, FIG. 15A illustrates the allocation state of the virtual servers v0 to v3 when being executed in the plurality of nodes #0 to #3 on the combination pattern py. Further, FIG. 15B illustrates a list of the distances between the cores and the memories of the virtual servers v0 to v3 on the combination pattern py. Here, since the sum of the distances of the combination pattern py is identical to the sum of the distances of the combination pattern px, the normalized process performance evaluation value on the combination pattern py is the same value as the normalized process performance evaluation value on the combination pattern px, and the calculation is omitted.

Figure 16:
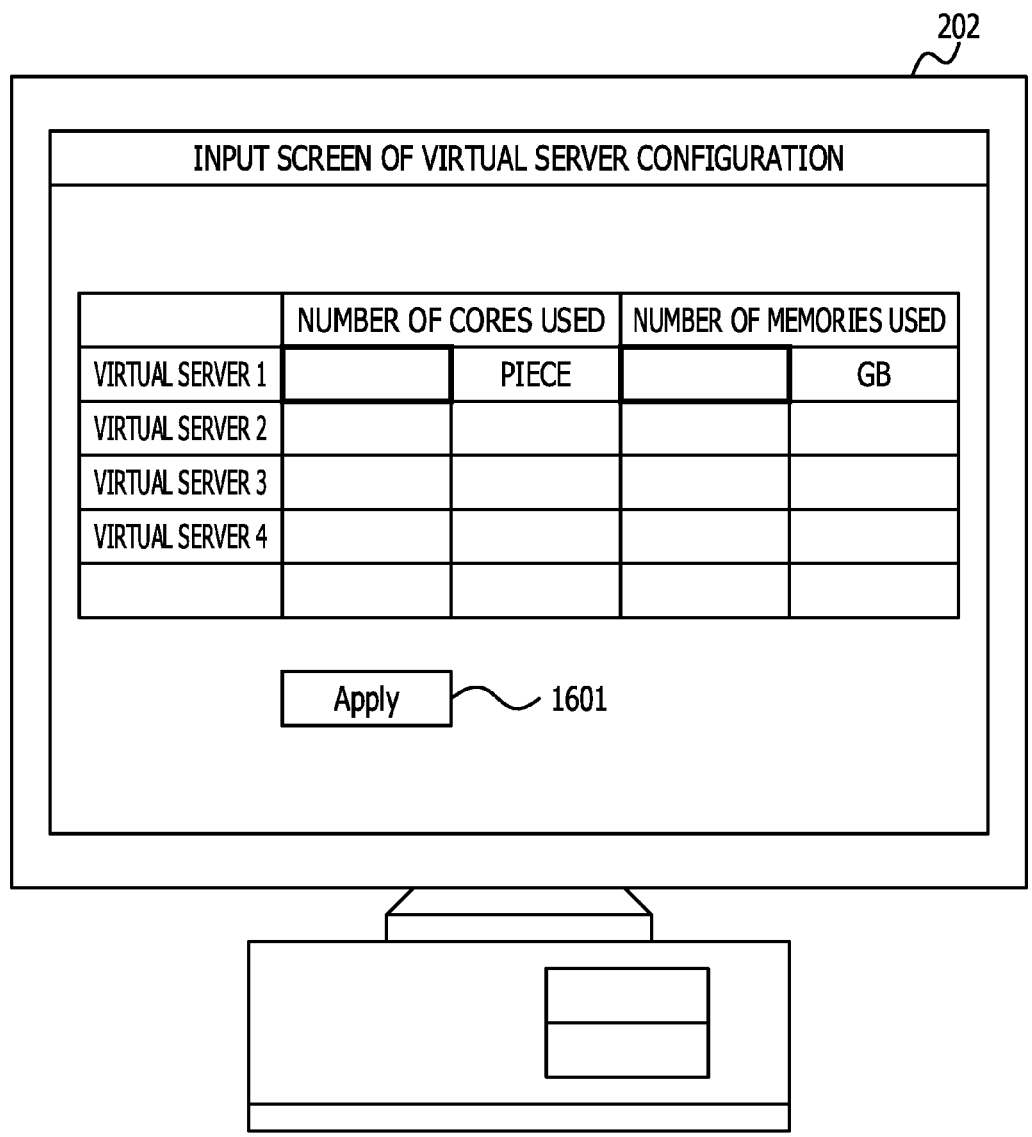
FIG. 16 is an explanatory diagram illustrating an example of an input of a virtual server configuration.

FIG. 16 is an explanatory diagram illustrating an example of an input of the virtual server configuration. FIG. 16 illustrates an example in which the management terminal 202 displays an input screen of the virtual server configuration. The management terminal 202 receives the number of cores and the capacities of the memories of the virtual servers per virtual server by an operation of the administrator. The received number of cores and the received capacities of the memories of the virtual servers are the values input by the administrator according to a request from a user of the NUMA system 203.

When an apply button 1601 is pressed, the management terminal 202 generates the virtual server configuring information 621 from the number of cores to be used and the sizes of the memories to be used for each input virtual server, and stores the generated virtual server configuring information 621 in the disk 405 or the like. Further, the management terminal 202 may store the virtual server configuring information 621 in the storage area of the server 201. With respect to the input sizes of the memories used, when the NUMA system 203 does not perform interleaving or memory mirroring, the management terminal 202 calculates the sizes of the memories to know the number of DIMMs from the capacity for one DIMM, converts the sizes into the number of DIMMs, and generates the virtual server configuring information 621. Meanwhile, when the NUMA system 203 performs the interleaving and the memory mirroring, the management terminal 202 calculates the input sizes of the memories to know the number of DIMM groups, converts the sizes into the number of DIMM groups, and generates the virtual server configuring information 621.

Figure 17:
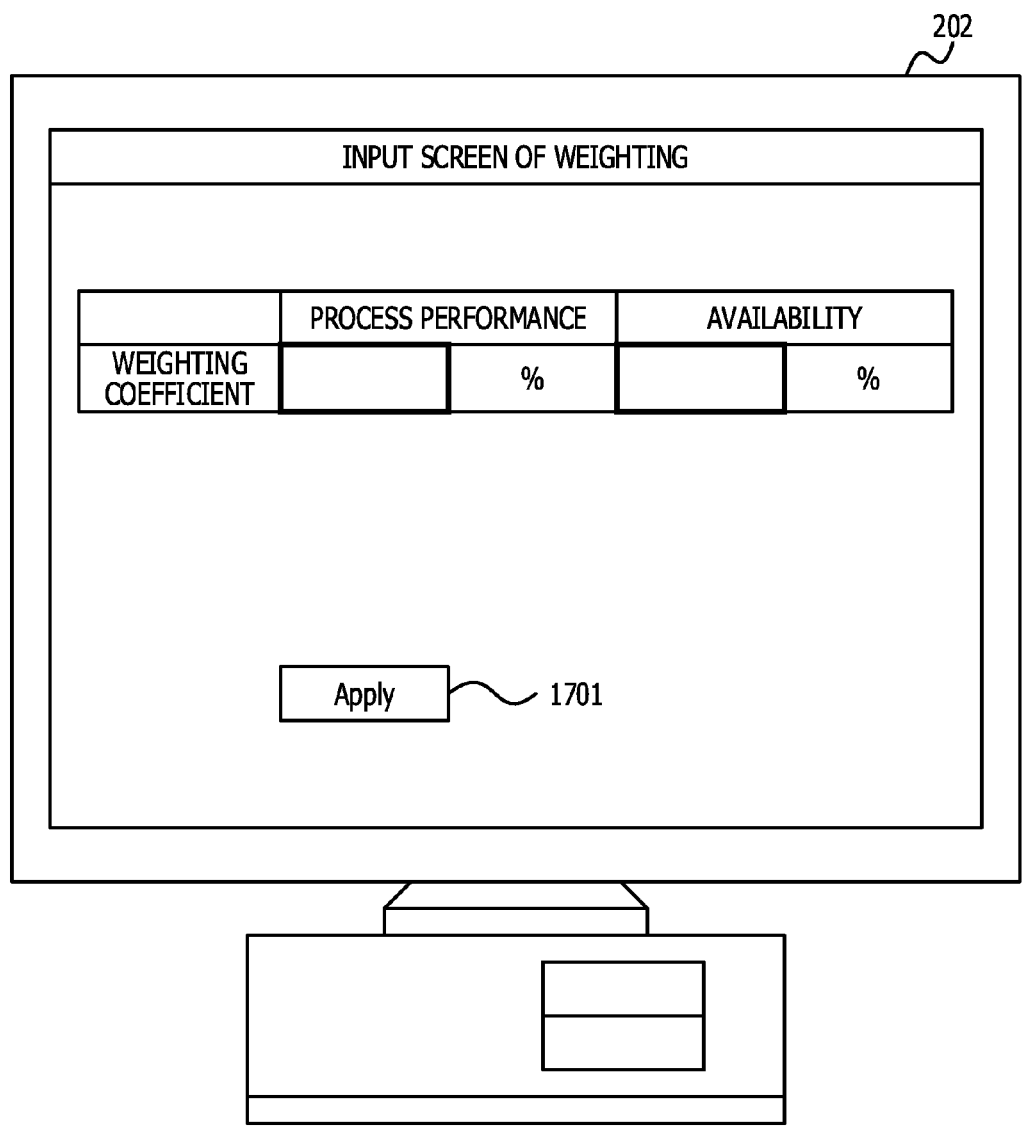
FIG. 17 is an explanatory diagram illustrating an example of an input of weighting.

FIG. 17 is an explanatory diagram illustrating an example of the input of the weighting. FIG. 17 illustrates an example in which the management terminal 202 displays the input screen of the weighting. The management terminal 202 receives a weighting coefficient of the process performance and a weighting coefficient of the availability by the operation of the administrator. For example, when the administrator considers the process performance as important, the management terminal 202 receives an input in which the weighting coefficient of the process performance is set to be 100%, and the weighting coefficient of the availability is set to be 0%. Meanwhile, when the administrator considers the process performance and the availability to be the same, the management terminal 202 receives an input in which the weighting coefficient of the process performance is set to be 50%, and the weighting coefficient of the availability is set to be 50%.

When the apply button 1701 is pressed, the management terminal 202 generates the weighting information 622 from the weighting coefficient of the input process performance and the weighting coefficient of the availability, and stores the generated weighting information 622 in the disk 405 or the like. Further, the management terminal 202 may store the weighting information 622 in the server 201.

As an example of the calculation of the weighting, the server 201 calculates the allocation evaluation value by using Equation (6) below.

An allocation evaluation value=a weighting coefficient of process performance×process performance evaluation value+a weighting coefficient of availability×availability evaluation value (6)

Screen examples illustrated in FIGS. 16 and 17 are examples when the management terminal 202 is included in the server system 200. When the management terminal 202 is not included in the server system 200, the server 201 displays a screen for generating the virtual server configuring information 621 and the weighting information 622 by the basic input/output system (BIOS) program, at the time of starting the server 201. The server 201 generates the virtual server configuring information 621 and the weighting information 622 by the operation of the operator of the server system 200.

Next, flowcharts illustrating the execution by the server 201 are described with reference to FIGS. 18 to 26.

Figure 18:
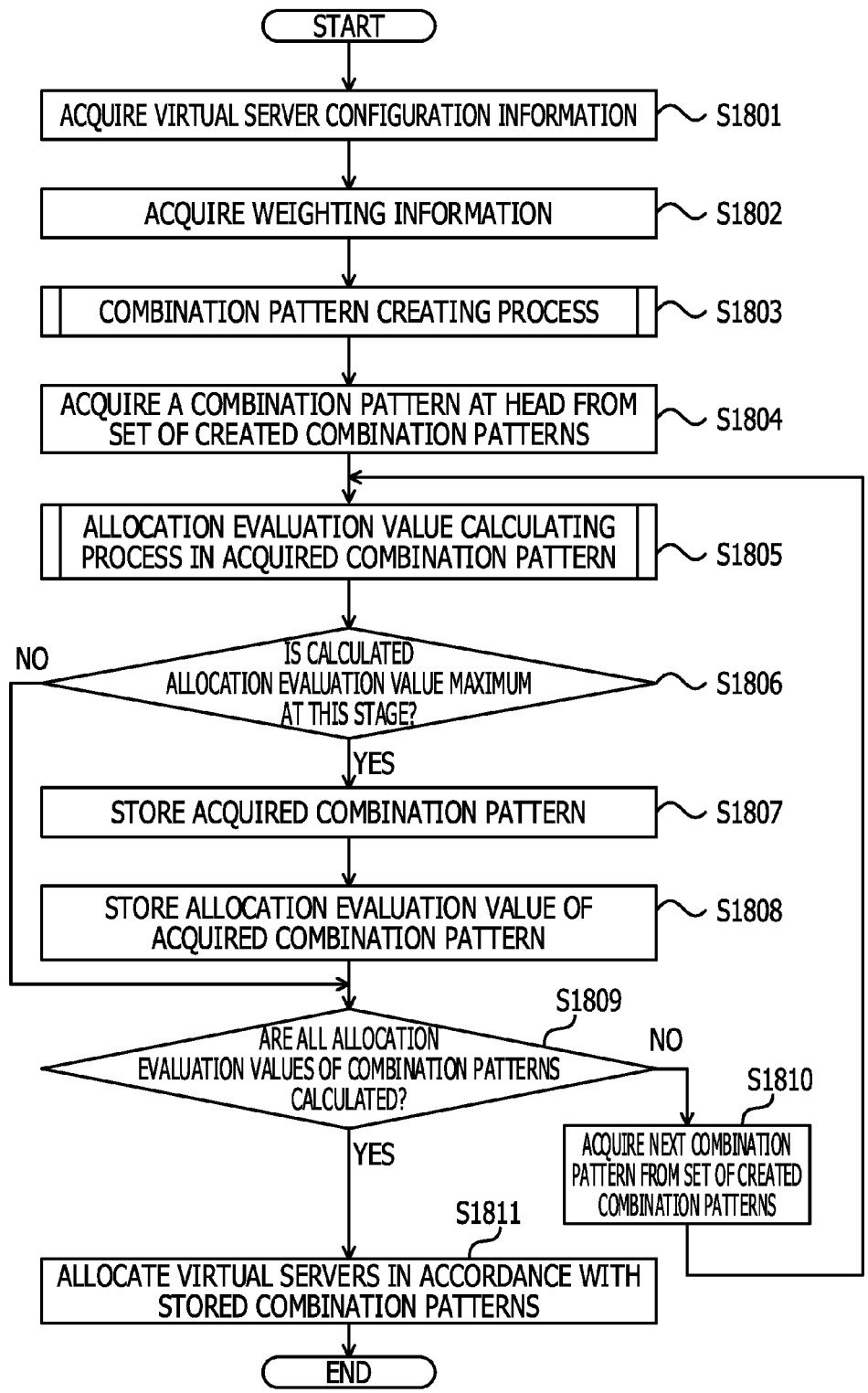
FIG. 18 is a flowchart illustrating an example of a virtual server allocation process sequence.

FIG. 18 is a flowchart illustrating an example of the virtual server allocation process sequence. The virtual server allocation process is a process of allocating virtual servers to the NUMA system 203.

The server 201 acquires the virtual server configuring information 621 (Step S1801). Next, the server 201 acquires the weighting information 622 (Step S1802). With respect to the processes in Steps S1801 and S1802, the server 201 acquires the virtual server configuring information 621 or the weighting information 622 from the storage area of the management terminal 202 by using intelligent platform management interface (IPMI). Subsequently, the server 201 executes the combination pattern creating process (Step S1803). Details of the combination pattern creating process are described in FIG. 19.

Next, the server 201 acquires a combination pattern at the head from a set of created combination patterns (Step S1804). Subsequently, the server 201 executes the allocation evaluation value calculating process in the acquired combination patterns (Step S1805). The allocation evaluation value calculating process in the combination pattern is described below in FIG. 22.

Next, the server 201 determines whether the calculated allocation evaluation value is the maximum at this stage (Step S1806). As a method of determining whether the calculated allocation evaluation value is the maximum at this stage, the server 201 compares the calculated allocation evaluation value with an allocation evaluation value stored in a process of Step S1808 described below, and determines that the calculated allocation evaluation value is the maximum at this stage if the calculated allocation evaluation value is greater. Further, if the stored allocation evaluation value does not exist, the server 201 determines that the calculated allocation evaluation value is the maximum at this stage.

If the calculated allocation evaluation value is the maximum at this stage (Step S1806: Yes), the server 201 stores the acquired combination pattern (Step S1807). Next, the server 201 stores the allocation evaluation value of the acquired combination pattern (Step S1808).

After the process of Step S1808 ends, or if the calculated allocation evaluation value is not the maximum at this stage (Step S1806: No), the server 201 determines whether all the allocation evaluation values of the combination patterns are calculated (Step S1809). If an allocation evaluation value of the combination pattern which has not yet calculated exists (Step S1809: No), the server 201 acquires a next combination pattern from the set of created combination patterns (Step S1810). After the process of Step S1810 ends, the server 201 proceeds to the process of Step S1805.

When all the allocation evaluation values of the combination patterns are calculated (Step S1809: Yes), the server 201 allocates virtual servers according to the stored combination patterns (Step S1811). After the virtual servers are allocated, the server 201 executes the functions of the virtual servers.

After the process of Step S1811 ends, the server 201 ends the virtual server allocation process. The server 201 may allocate the virtual servers according to the combination pattern considered by the operator of the server system 200 as the optimum in terms of two evaluation items of the process performance and the availability by executing the virtual server allocation process.

Further, with respect to the process of Step S1806, the server 201 determines whether the calculated allocation evaluation value is the maximum at this stage, but the server 201 may determine whether the availability evaluation value or the process performance evaluation value is the maximum at this stage. Further, in the process of Step S1811, the virtual servers are allocated according to the combination pattern of which the calculated allocation evaluation value is the maximum, but the server 201 may execute a process described below, before the process of Step S1811. As the process to be performed before the process of Step S1811, the server 201 outputs some combination patterns in a descending order of the calculated allocation evaluation values among the created combination patterns in association with the allocation evaluation values, to the management terminal 202. Then, the management terminal 202 displays a list in which some combination patterns associated with the allocation evaluation values are output. Subsequently, the management terminal 202 transmits the combination patterns designated by the operator of the server system 200 to the server 201. The server 201 receiving the designated combination pattern allocates the plurality of virtual servers according to the received combination patterns.

Figure 19:
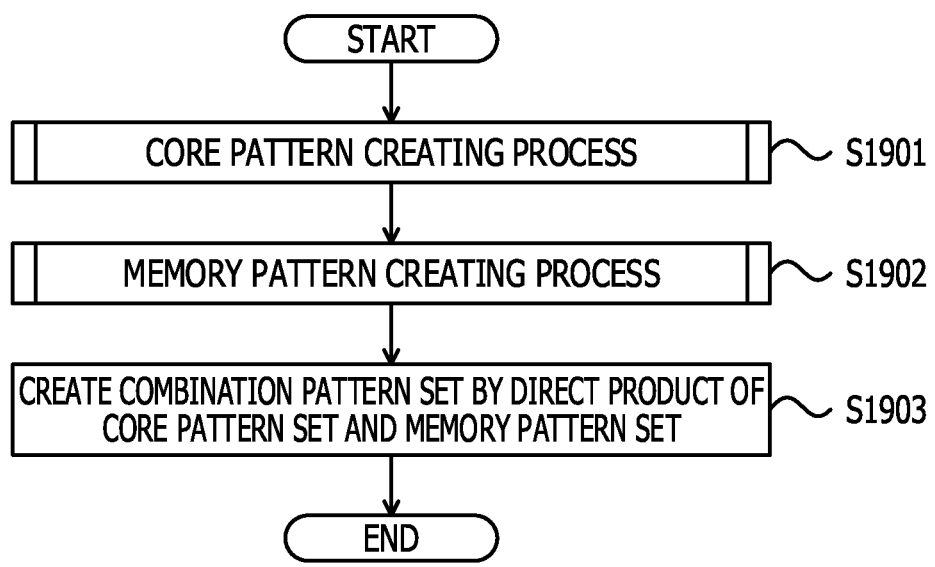
FIG. 19 is a flowchart illustrating an example of a combination pattern creating process sequence.

FIG. 19 is a flowchart illustrating an example of the combination pattern creating process sequence. The combination pattern creating process is a process of creating the combination pattern. The server 201 executes the core pattern creating process (Step S1901). Details of the core pattern creating process are described in FIG. 20. Next, the server 201 executes the memory pattern creating process (Step S1902). The memory pattern creating process is described below in FIG. 21. Subsequently, the server 201 creates a set of the combination patterns by the direct product of a set of core patterns and a set of the memory patterns (Step S1903). After the process of Step S1903 ends, the server 201 ends the combination pattern creating process. The server 201 may create the combination pattern by executing the combination pattern creating process.

Figure 20:
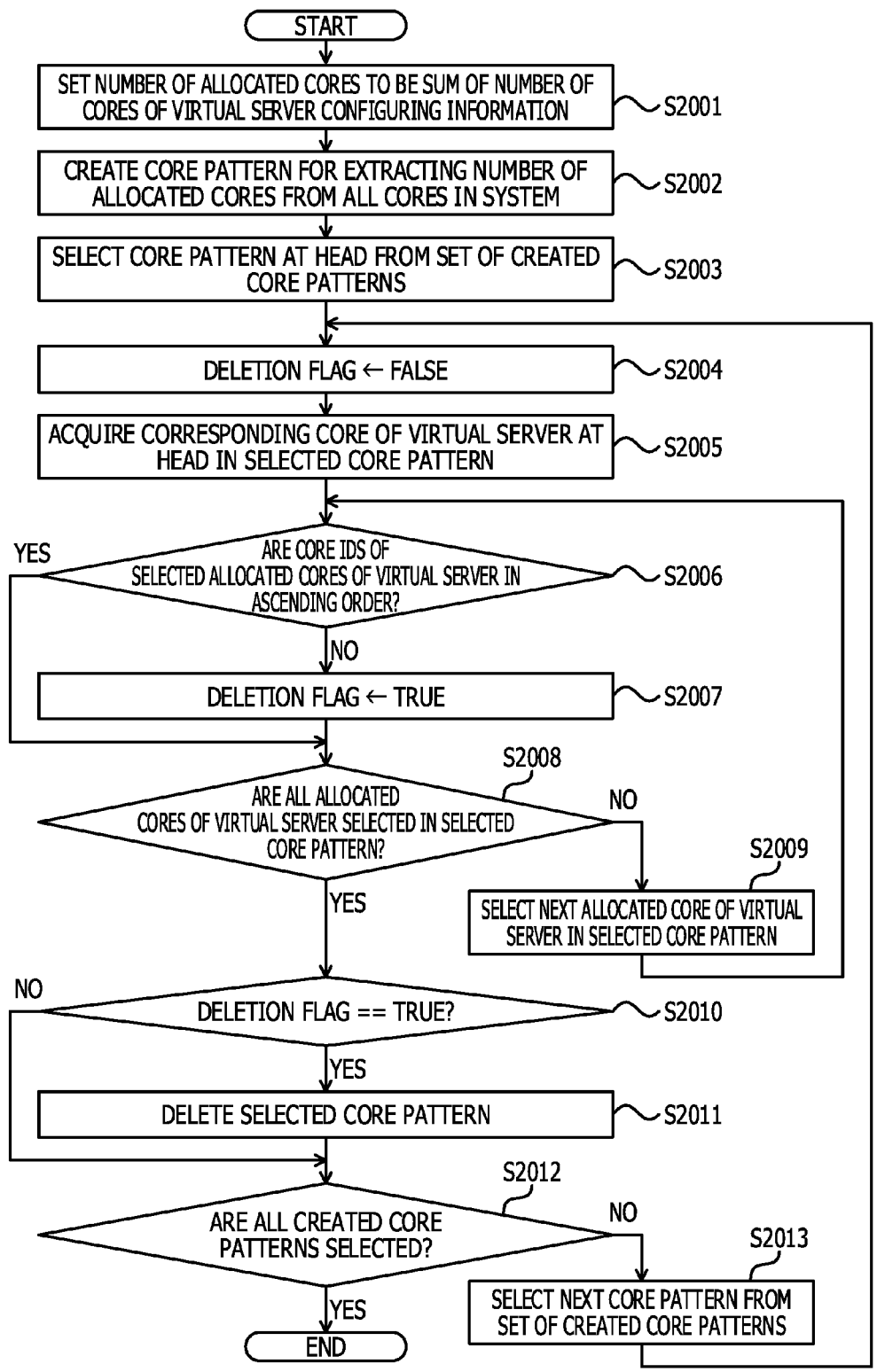
FIG. 20 is a flowchart illustrating an example of a core pattern creating process sequence.

FIG. 20 is a flowchart illustrating an example of the core pattern creating process sequence. The core pattern creating process is a process of creating core patterns. The server 201 sets the number of allocated cores to be a sum of the number of cores of the virtual server configuring information 621 (Step S2001). Next, the server 201 creates a core pattern for extracting the number of allocated cores from all the cores in the NUMA system 203 (Step S2002). Subsequently, the server 201 selects a core pattern at the head from the set of the created core patterns (Step S2003).

Next, the server 201 substitutes "false" to a deletion flag (Step S2004). The deletion flag is a flag indicating that a selected core pattern is to be deleted due to the redundancy. If the value is "true", the deletion flag indicates that the selected core pattern is redundant and to be deleted. Subsequently, the server 201 acquires the corresponding core of the virtual server at the head in the selected core pattern (Step S2005). Next, the server 201 determines whether core IDs of the selected allocated cores of the virtual server are in an ascending order (Step S2006). If the core IDs of the selected allocated cores of the virtual server are not in an ascending order (Step S2006: No), the server 201 substitutes "true" to the deletion flag (Step S2007).

After the process of Step S2007 ends, or if the core IDs of the selected allocated cores of the virtual server are in an ascending order (Step S2006: Yes), the server 201 determines whether all the allocated cores of the virtual server are selected in the selected core pattern (Step S2008). Further, if an unselected allocated core of the virtual server exists (Step S2008: No), the server 201 selects the next allocated core of the virtual server in the selected core pattern (Step S2009). After the process of Step S2009 ends, the server 201 proceeds to the process of Step S2006.

When all the allocated cores of the virtual servers are selected (Step S2008: Yes), the server 201 determines whether the deletion flag is "true" (Step S2010). If the deletion flag is "true" (Step S2010: Yes), the server 201 deletes the selected core pattern (Step S2011).

After the process of Step S2011 ends or when the deletion flag is "false" (Step S2010: No), the server 201 determines whether all the created core patterns are selected (Step S2012). Further, when an unselected created core pattern exists (Step S2012: No), the server 201 selects a next core pattern from the set of the created core patterns (Step S2013). After the process of Step S2013 ends, the server 201 proceeds to the process of Step S2004.

When all the created core patterns are selected (Step S2012: Yes), the server 201 ends the core pattern creating process. The server 201 may create a core pattern which is not redundant by executing the core pattern creating process.

Figure 21:
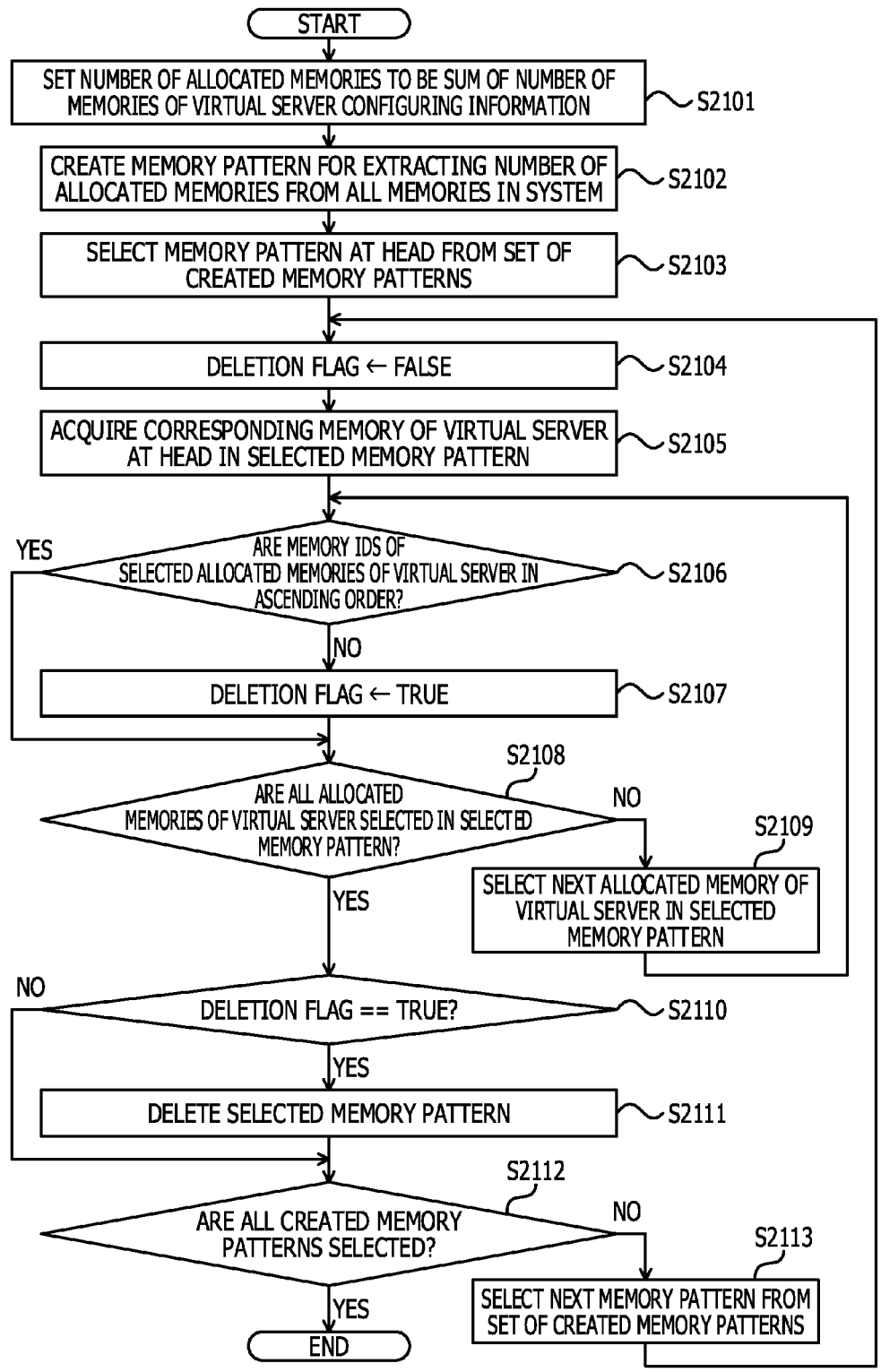
FIG. 21 is a flowchart illustrating an example of a memory pattern creating process sequence.

FIG. 21 is a flowchart illustrating an example of the memory pattern creating process sequence. The memory pattern creating process is a process of creating a memory pattern. Here, since the processes of Steps S2101 to S2113 are processes obtained by merely substituting "cores" in the respective processes of Steps S2001 to S2013 illustrated in FIG. 20 for "memories", the description thereof is omitted. The server 201 may create a memory pattern which is not redundant by executing the memory pattern creating process.

Figure 22:
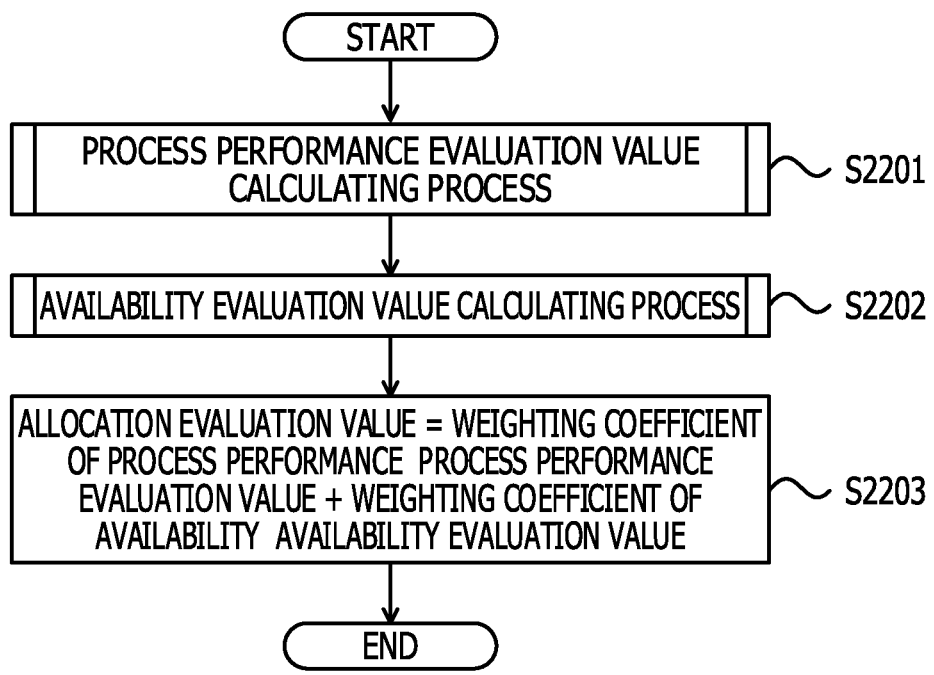
FIG. 22 is a flowchart illustrating an example of an allocation evaluation value calculating process sequence in a combination pattern.

FIG. 22 is a flowchart illustrating an example of the allocation evaluation value calculating process sequence in the combination pattern. The allocation evaluation value calculating process in the combination pattern is a process of calculating the allocation evaluation value in the combination pattern.

The server 201 executes a process performance evaluation value calculating process (Step S2201). The process performance evaluation value calculating process is described below in FIGS. 23 and 24. Next, the server 201 executes an availability evaluation value calculating process (Step S2202). The availability evaluation value calculating process is described below in FIGS. 25 and 26. Subsequently, the server 201 calculates "a weighting coefficient of process performance×a process performance evaluation value+a weighting coefficient of availability×an availability evaluation value" as an allocation evaluation value by referring to the weighting information 622 (Step S2203). After a process of Step S2203 ends, the server 201 ends the allocation evaluation value calculating process in the combination pattern. The server 201 may calculate the allocation evaluation value in the combination pattern by executing the allocation evaluation value calculating process in the combination pattern.

Figure 23:
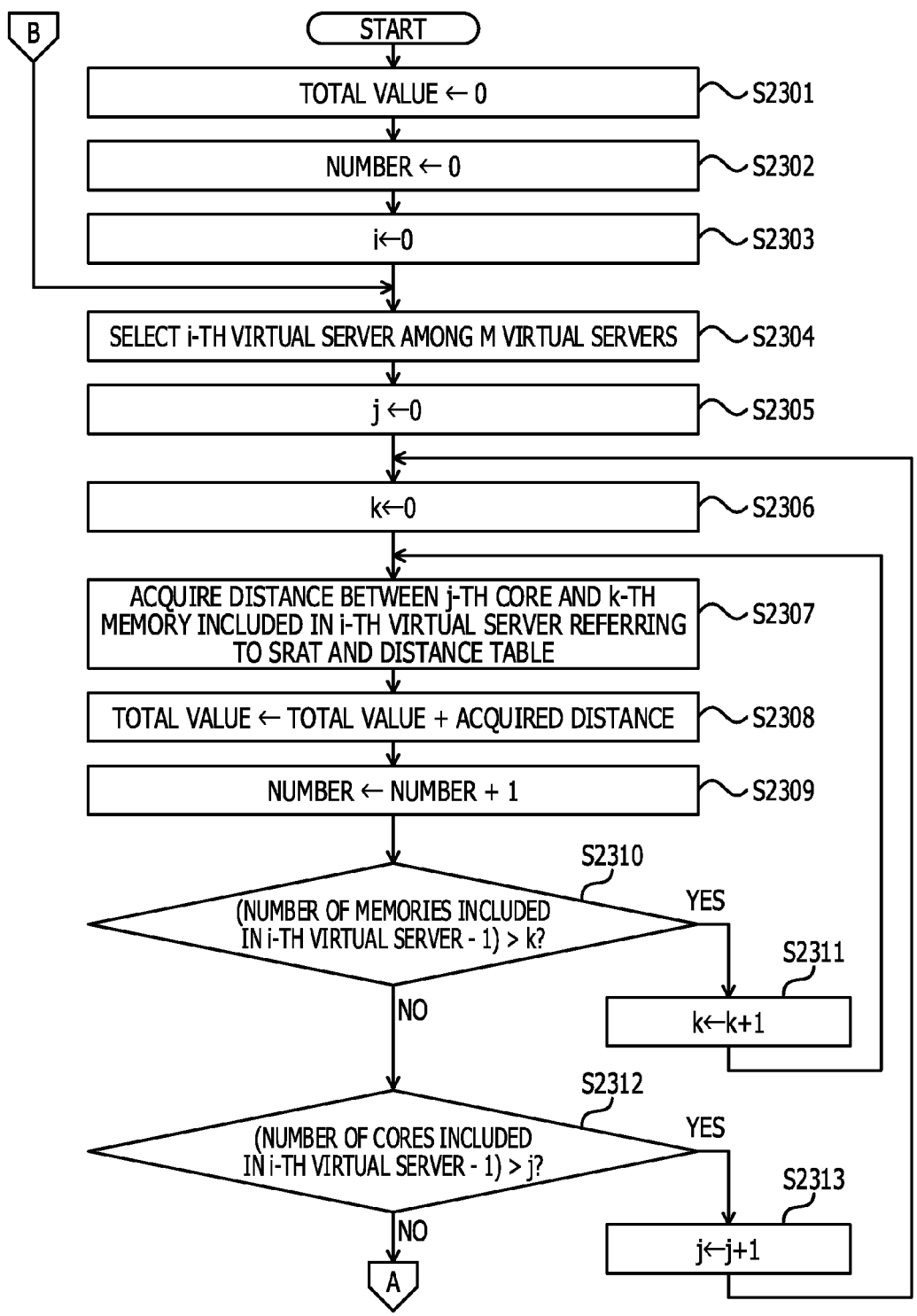
FIG. 23 is a flowchart (first) illustrating an example of a process performance evaluation value calculating process sequence.
Figure 24:
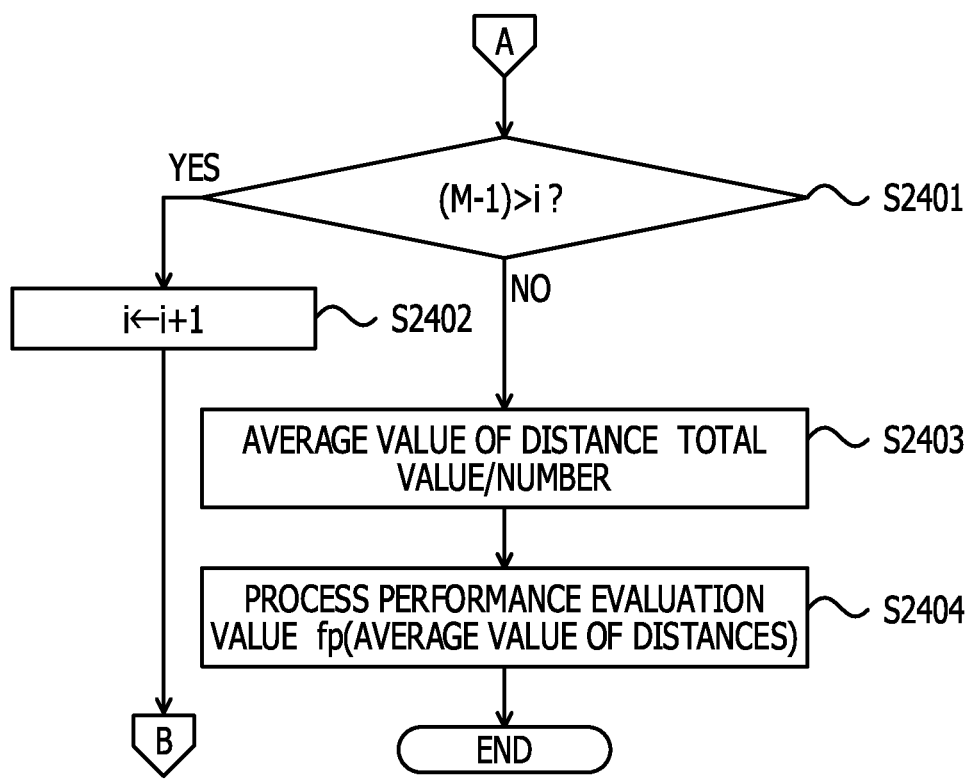
FIG. 24 is a flowchart (second) illustrating an example of the process performance evaluation value calculating process sequence.

FIG. 23 is a flowchart (first) illustrating an example of a process performance evaluation value calculating process sequence. Further, FIG. 24 is a flowchart (second) illustrating an example of the process performance evaluation value calculating process sequence. The process performance evaluation value calculating process calculates and normalizes the process performance evaluation value.

The server 201 substitutes 0 for a total value (Step S2301). Next, the server 201 substitutes 0 for the number (Step S2302). Here, the total value and the number are variables used in the process performance evaluation value calculating process. Subsequently, the server 201 substitutes 0 for i (Step S2303). i is a variable used in the process performance evaluation value calculating process, and is a variable indicating the index of the virtual server.

Next, the server 201 selects an i-th virtual server from M virtual servers (Step S2304). Subsequently, the server 201 substitutes 0 for j (Step S2305). Next, the server 201 substitutes 0 for k (Step S2306). Here, j and k are respectively variables used in the process performance evaluation value calculating process, and are a variable indicating an index of a core in a virtual server and a variable indicating an index of a memory in a virtual server.

Subsequently, the server 201 acquires a distance between a j-th core and a k-th memory included in the i-th virtual server referring to the SRAT 623 and the distance table 1002 (Step S2307). Next, the server 201 substitutes the total value+the acquired distance for the total value (Step S2308). Subsequently, the server 201 substitutes the number+1 for the number (Step S2309). Next, the server 201 determines whether (the number of memories included in the i-th virtual server−1) is greater than k (Step S2310).

If (the number of memories included in the i-th virtual server−1) is greater than k, (Step S2310: Yes), the server 201 increments k (Step S2311). After the process of Step S2311 ends, the server 201 proceeds to the process of Step S2307. When (the number of memories included in the i-th virtual server−1) is equal to or less than k (Step S2310: No), the server 201 determines whether (the number of cores included in the i-th virtual server−1) is greater than j (Step S2312). When (the number of cores included in the i-th virtual server−1) is greater than j (Step S2312: Yes), the server 201 increments j (Step S2313). After the process of Step S2313 ends, the server 201 proceeds to the process of Step S2306. When (the number of cores included in the i-th virtual server−1) is equal to or less than j (Step S2312: No), the server 201 proceeds to the process of Step S2401 illustrated in FIG. 24.

When the result of Step S2312 is No, the server 201 determines whether (M−1) is greater than i (Step S2401). If (M−1) is greater than i (Step S2401: Yes), the server 201 increments i (Step S2402). After the process of Step S2402 ends, the server 201 proceeds to the process of Step S2304.

When (M−1) is equal to or less than i (Step S2401: No), the server 201 calculates the total value/the number as the average value of the distance (Step S2403). Next, the server 201 calculates fp(an average value of distances) as a normalized process performance evaluation value (Step S2404). After the process of Step S2404 ends, the server 201 ends the process performance evaluation value calculating process. The server 201 may calculate and normalize the process performance evaluation value by executing the process performance evaluation value calculating process.

Figure 25:
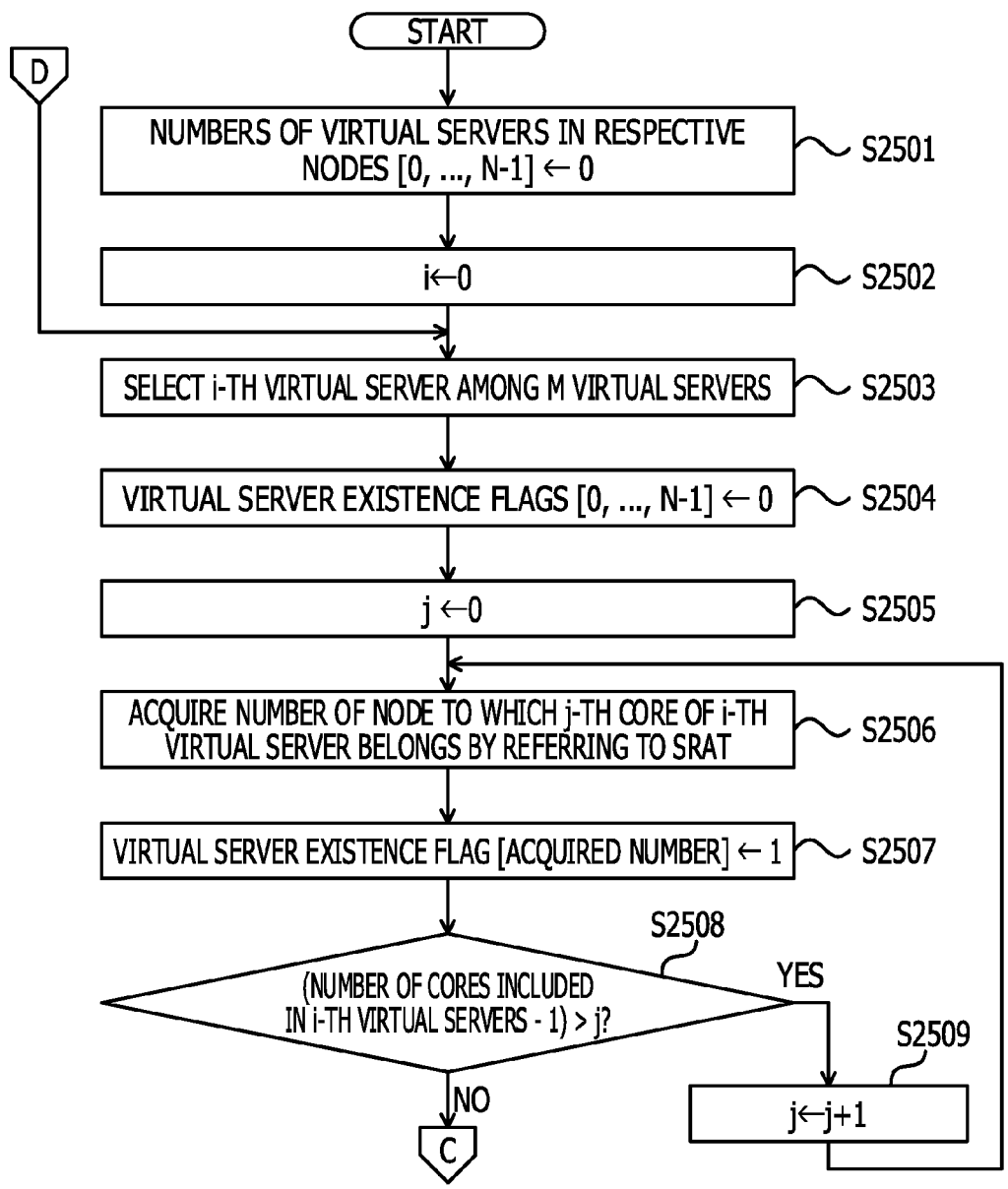
FIG. 25 is a flowchart (first) illustrating an example of an availability evaluation value calculating process sequence.
Figure 26:
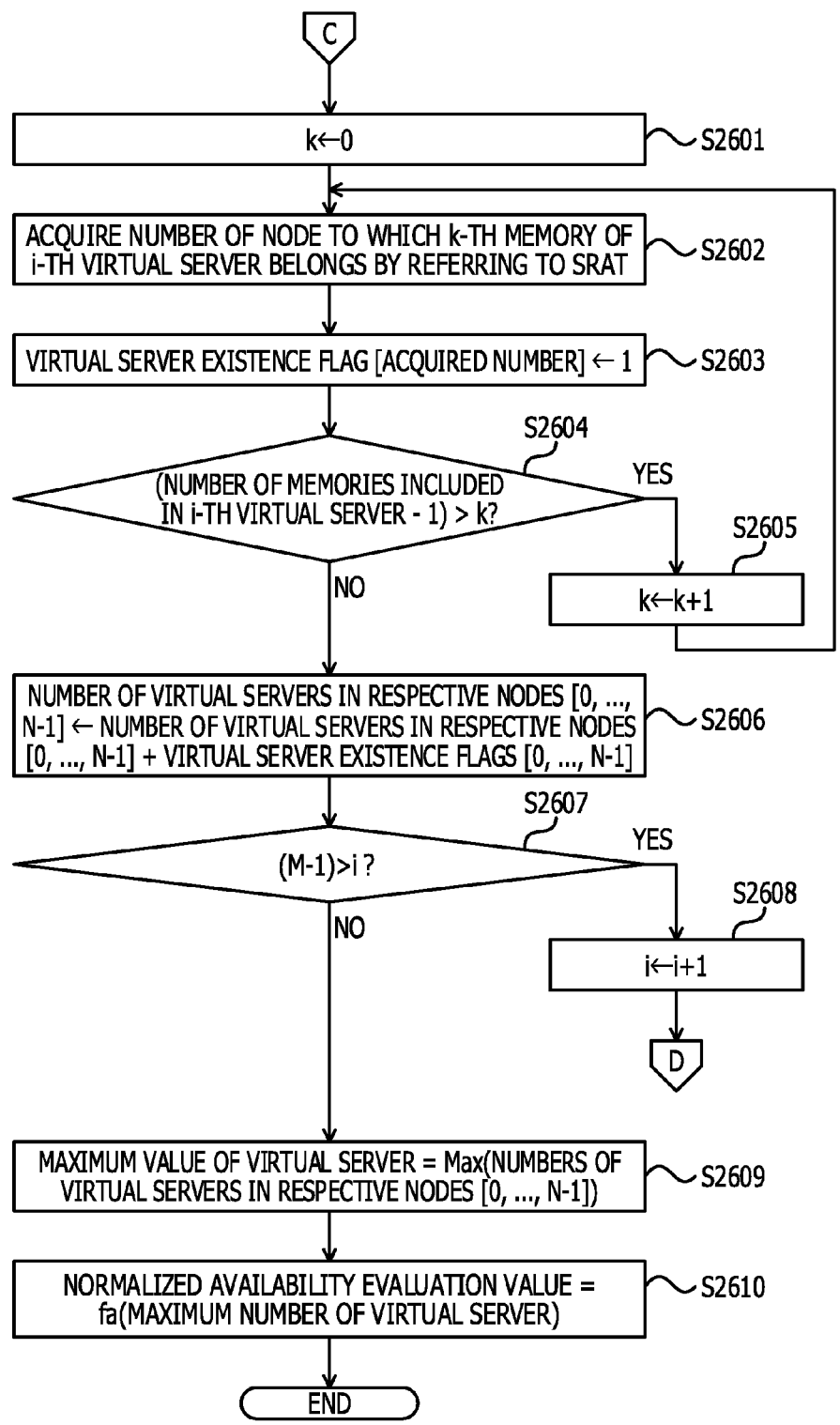
FIG. 26 is a flowchart (second) illustrating an example of the availability evaluation value calculating process sequence.

FIG. 25 is a flowchart (first) illustrating an example of the availability evaluation value calculating process sequence. Further, FIG. 26 is a flowchart (second) illustrating an example of the availability evaluation value calculating process sequence. The availability evaluation value calculating process is a process of calculating and normalizing the availability evaluation value.

The server 201 substitutes 0 for the numbers of virtual servers in the respective nodes [0, . . . , N−1] (Step S2501). Here, the numbers of virtual servers in the respective nodes [0, . . . , N−1] are an arrangement of N. Further, in the process of Step S2501, the server 201 substitutes 0 for the respective items of the numbers of virtual servers in the respective nodes [0, . . . , N−1].

Next, the server 201 substitutes 0 for i (Step S2502). i is a variable used in the availability evaluation value calculating process, and is a variable indicating an index of a virtual server. Subsequently, the server 201 selects an i-th virtual server from M virtual servers (Step S2503). Next, the server 201 substitutes 0 for virtual server existence flags [0, . . . , N−1] (Step S2504). The virtual server existence flags [0, . . . , N−1] are an arrangement of flags illustrating whether an i-th virtual server exists in the respective nodes. If the value of the flag is 0, it indicates that the i-th virtual server does not exist, and if the value of the flag is 1, it indicates that the i-th virtual server exists.

Subsequently, the server 201 substitutes 0 for j (Step S2505). Here, j is a variable used in the availability evaluation value calculating process, and a variable indicating index of a core in a virtual server. Next, the server 201 acquires a number of a node to which the j-th core of the i-th virtual server belongs by referring to the SRAT 623 (Step S2506). Subsequently, the server 201 substitutes 1 for the virtual server existence flag [an acquired number] (Step S2507). Next, the server 201 determines whether (the number of cores included in the i-th virtual servers−1) is greater than j (Step S2508). When (the number of cores included in the i-th virtual servers−1) is greater than j (Step S2508: Yes), the server 201 increments j (Step S2509). After the process of Step S2509 ends, the server 201 proceeds to the process of Step S2506.

When (the number of cores included in the i-th virtual servers−1) is equal to or less than j (Step S2508: No), the server 201 proceeds to the process of Step S2601 illustrated in FIG. 26.

When the result of Step S2508 is No, the server 201 substitutes 0 for k (Step S2601). Here, k is a variable used in the availability evaluation value calculating process, and is a variable indicating an index of a memory in a virtual server. Next, the server 201 acquires a number of a node to which the k-th memory of the i-th virtual server belongs by referring to the SRAT 623 (Step S2602). Subsequently, the server 201 substitutes 1 for the virtual server existence flag [an acquired number] (Step S2603). Next, the server 201 determines whether (the number of memories included in the i-th virtual server−1) is greater than k (Step S2604). When (the number of memories included in the i-th virtual server−1) is greater than k (Step S2604: Yes), the server 201 increments k (Step S2605). After the process of Step S2605 ends, the server 201 proceeds to the process of Step S2602.

When (the number of memories included in the i-th virtual server−1) is equal to or less than k (Step S2604: No), the server 201 substitutes the number of virtual servers in the respective nodes [0, . . . , N−1]+the virtual server existence flags [0, . . . , N−1] for the number of virtual servers in the respective nodes [0, . . . , N−1] (Step S2606). The process of Step S2606 is an addition of arrangements, and, for example, the server 201 substitutes the number of virtual servers in the respective nodes [0]+the virtual server existence flags [0] for the number of virtual servers of the respective nodes [0] as a 0-th element. The server 201 performs the same process on the first element to the N−1-th element.

Next, the server 201 determines whether (M−1) is greater than i (Step S2607). When (M−1) is greater than i (Step S2607: Yes), the server 201 increments i (Step S2608). After the process of Step S2608 ends, the server 201 proceeds to the process of Step S2503.

When (M−1) is equal to or less than i (Step S2607: No), the server 201 calculates the maximum number of the virtual server=Max(the numbers of virtual servers in the respective nodes [0, . . . , N−1]) (Step S2609). Next, the server 201 calculates fa(the maximum number of virtual server) as the normalized availability evaluation value (Step S2610). After the process of Step S2610 ends, the server 201 ends the availability evaluation value calculating process. The server 201 may calculate and normalize the availability evaluation value by executing the availability evaluation value calculating process.

As described above, according the server 201, the availability evaluation value of the plurality of virtual servers on the NUMA system 203 is calculated from the number of virtual servers for each node executed by using the cores and the memories included in the respective nodes in the NUMA system 203. Accordingly, the server 201 may evaluate the degree of the influence which is given by the errors of a portion of nodes among the plurality of nodes to the plurality of virtual servers. Further, the server 201 may allocate the plurality of virtual servers in which the influence which is given by errors of a portion of nodes to the plurality of virtual servers is the minimum by allocating the virtual servers according to the combination pattern in which the availability evaluation value is the maximum.

Further, the availability evaluation value may be interpreted to be a cost used for a restoration. Specifically, it is assumed that the server system 200 periodically backs up the information relating to the business application executed on the NUMA system 203. Then, it is assumed that the availability evaluation value is the maximum value among the plurality of numbers of virtual servers. Here, when an error is generated in one node, the availability evaluation value is the maximum value of the number of virtual servers that restore the virtual server by using backed-up data. Accordingly, as the availability evaluation value is smaller, the cost used for the restoration is smaller.

Further, according to the server 201, the process performance evaluation values of the plurality of virtual servers may be calculated based on the access performance from cores to memories used in the execution of the respective virtual servers. Accordingly, the server 201 may select a combination pattern of which process performance is optimum by using the process performance evaluation values of the plurality of virtual servers in a certain combination pattern. Further, the server 201 may allocate the plurality of virtual servers in which the process performance of the sum of the plurality of virtual servers is the maximum by allocating virtual servers according to the combination pattern in which the process performance evaluation value is the maximum. Further, the server 201 may provide a standard for determining whether a certain combination pattern is an optimum pattern to the process performance by causing the operator of the server system 200 to browse process performance evaluation values of the plurality of virtual servers in a certain combination pattern.

Further, according to the server 201, the availability evaluation value may be normalized based on the number of the plurality of virtual servers. The normalized availability evaluation value is a value which does not depend on the number of virtual servers. Accordingly, when the operator of the server system 200 browses the availability evaluation values of the plurality of virtual servers in a certain combination pattern, the determination is easier compared with the availability evaluation value which is not normalized.

Further, according to the server 201, the process performance evaluation value may be normalized based on the maximum value of the access performance from the core to the memory used in the execution of the respective virtual servers. The normalized process performance evaluation value is a value that does not depend on the length of the distance between nodes. Accordingly, when an operator of the server system 200 browses the process performance evaluation values of the plurality of virtual servers in a certain combination pattern, the determination is easier compared with the process performance evaluation value which is not normalized. Further, the server 201 may match and output the normalized availability evaluation value and the normalized process performance evaluation value. Accordingly, when the operator of the server system 200 browses the normalized availability evaluation value and the normalized process performance evaluation value, it may be easily determined whether a certain combination pattern is a pattern of which the availability and the process performance is considered as important.

Further, according to the server 201, the allocation evaluation values in which either of the normalized availability evaluation value or the normalized process performance evaluation value is weighted and accumulated may be calculated. Accordingly, the server 201 may calculate the allocation evaluation values in which the availability and the process performance are considered at the same time in the plurality of virtual servers. Then, the server 201 may have the virtual server configuration considered to be optimum by the operator of the server system 200 by allocating the virtual servers to the plurality of nodes according to the combination pattern in which the allocation evaluation value is the maximum.

Further, according to the server 201, the combination pattern may be created by referring to the virtual server configuring information 621. Accordingly, the server 201 may calculate the availability evaluation values, the process performance evaluation values, and the allocation evaluation values with respect to all the obtainable combination patterns from the cores and the memories included in the plurality of nodes.

Further, according to the server 201, the combination pattern associated with the availability evaluation value may be output. In the same manner, the server 201 may output the combination pattern associated with the process performance evaluation value, and may output the combination pattern associated with the allocation evaluation value. To describe the availability evaluation value as an example, the server 201 may present the availability evaluation value with respect to the combination pattern which is not considered by the operator by causing the availability evaluation value with respect to the combination pattern created by the server 201 to be browsed by the operator of the server system 200.

Further, according to the server 201, since the number of created combination patterns becomes massive, among the created combination patterns, the combination patterns of which any of the availability evaluation values, the process performance evaluation values, and the allocation evaluation values are ranked higher may be narrowed and output. Accordingly, the server 201 may provide the combination patterns of which the availability and the process performance are high, among a massive number of combination patterns to the operator of the server system 200.

Further, according to the server 201, the availability evaluation values, the process performance evaluation values, and the allocation evaluation values associated with the respective combination patterns of the plurality of combination patterns may be output as a list. The combination pattern in which the allocation evaluation value is the maximum is not a value in which both of the availability evaluation value and the process performance evaluation value are high, but may be a value in which either of the availability evaluation value or the process performance evaluation value is high. In this case, the operator of the server system 200 may browse the list and select the combination pattern of which the availability evaluation value and the process performance evaluation value are somewhat high, rather than the combination pattern of which the allocation evaluation value is the maximum, but of which either of the availability evaluation value or the process performance evaluation value is high.

In addition, the information processing method described according to the present embodiment may be realized by executing a program prepared in advance on a computer such as a personal computer or a workstation. The information processing program is executed by being recorded in a computer-readable recording medium such as a hard disk, a flexible disk, a compact disc-read only memory (CD-ROM), and a digital versatile disc (DVD) and read by the computer from the storage medium. In addition, the present information processing program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a first memory; and
a processor coupled to the first memory and configured to:
specify a number of virtual machines executed on each node of a plurality of nodes on an information processing system, each node of the plurality of nodes being configured to perform as a plurality of virtual machines, the plurality of nodes each including a plurality of cores and a plurality of second memories, and at least a portion of the plurality of second memories being shared by at least two of the plurality of nodes, and
calculate a value indicating a degree of deviation of the number of the virtual machines between the plurality of nodes based on a number of cores and a number of second memories included in each virtual machine of the plurality of virtual machines.

2. The information processing apparatus according to claim 1, wherein the processor is configured to acquire, from the information processing system, information for specifying a core and a memory used for executing each virtual machine of the plurality of virtual machines, among the plurality of cores and the plurality of second memories of the plurality of nodes.

3. The information processing apparatus according to claim 2, wherein the processor is configured to calculate a value indicating process performance of the plurality of virtual machines, based on access performance between the core and the memory used for executing each virtual machine of the plurality of virtual machines.

4. The information processing apparatus according to claim 3, wherein the processor is configured to normalize a value indicating the process performance based on a maximum value and a minimum value of the access performance between the plurality of cores and the plurality of second memories of the plurality of nodes.

5. The information processing apparatus according to claim 4,
wherein the processor is configured to:
normalize the calculated value indicating the degree of deviation based on the number of the plurality of virtual machines, and
calculate a value obtained by weighting one of the normalized value indicating the degree of deviation and the normalized value indicating the process performance and summing up the weighted value and the other value.

6. The information processing apparatus according to claim 5, wherein the processor is configured to output association information with the calculated sum-up value.

7. The information processing apparatus according to claim 3, wherein the processor is configured to output, with the calculated value indicating the process performance, information indicating combinations between the cores and the second memories included in each virtual machine of the plurality of virtual machines.

8. The information processing apparatus according to claim 1, wherein the processor is configured to normalize the calculated value indicating the degree of deviation based on the number of each of the virtual machines.

9. The information processing apparatus according to claim 1, wherein the processor is configured to output, with the calculated value indicating the degree of deviation, information indicating combinations between the cores and the second memories included in each virtual machine of the plurality of virtual machines.

10. An information processing method comprising:
specifying a number of virtual machines executed on each node of a plurality of nodes on an information processing system, each node of the plurality of nodes being configured to perform as a plurality of virtual machines, the plurality of nodes each including a plurality of cores and a plurality of second memories, and at least a portion of the plurality of second memories being shared by at least two of the plurality of nodes; and
calculating a value indicating a degree of deviation of the number of the virtual machines between the plurality of nodes based on a number of cores and a number of second memories included in each virtual machine of the plurality of virtual machines.

11. The information processing method according to claim 10, further comprising:
acquiring, from the information processing system, information for specifying a core and a memory used for executing each virtual machine of the plurality of virtual machines, among the plurality of cores and the plurality of second memories of the plurality of nodes.

12. The information processing method according to claim 11, further comprising:
calculating a value indicating process performance of the plurality of virtual machines, based on access performance between the core and the memory used for executing each virtual machine of the plurality of virtual machines.

13. The information processing method according to claim 10, further comprising:
normalizing the calculated value indicating the degree of deviation based on the number of each of the virtual machines.

14. A non-transitory computer-readable storage medium storing a program that causes an information processing apparatus to execute a process, the process comprising:
specifying a number of virtual machines executed on each node of a plurality of nodes on an information processing system, each node of the plurality of nodes being configured to perform as a plurality of virtual machines, the plurality of nodes each including a plurality of cores and a plurality of second memories, and at least a portion of the plurality of second memories being shared by at least two of the plurality of nodes; and
calculating a value indicating a degree of deviation of the number of the virtual machines between the plurality of nodes based on a number of cores and a number of second memories included in each virtual machine of the plurality of virtual machines.

15. The non-transitory computer-readable storage medium according to claim 14, the process further comprising:
acquiring, from the information processing system, information for specifying a core and a memory used for executing each virtual machine of the plurality of virtual machines, among the plurality of cores and the plurality of second memories of the plurality of nodes.

16. The non-transitory computer-readable storage medium according to claim 15, the process further comprising:
calculating a value indicating process performance of the plurality of virtual machines, based on access performance between the core and the memory used for executing each virtual machine of the plurality of virtual machines.

* * * * *